US010544599B2

(12) United States Patent
King

(10) Patent No.: US 10,544,599 B2
(45) Date of Patent: Jan. 28, 2020

(54) INTEGRATED, MULTI-LEVEL AIRPORT TERMINAL SYSTEM

(71) Applicant: Raymond King, Miami, FL (US)

(72) Inventor: Raymond King, Miami, FL (US)

( * ) Notice: Subject to any disclaimer, the term of this patent is extended or adjusted under 35 U.S.C. 154(b) by 0 days.

(21) Appl. No.: 15/174,934

(22) Filed: Jun. 6, 2016

(65) Prior Publication Data

US 2017/0350148 A1    Dec. 7, 2017

(51) Int. Cl.
*E04H 3/00* (2006.01)
*B64F 1/305* (2006.01)
*B64F 1/36* (2017.01)

(52) U.S. Cl.
CPC .............. *E04H 3/00* (2013.01); *B64F 1/305* (2013.01); *B64F 1/368* (2013.01)

(58) Field of Classification Search
CPC . E04B 1/342; B64F 1/222; E04H 6/00; E04H 6/08; E04H 6/10; E04H 6/44
See application file for complete search history.

(56) References Cited

U.S. PATENT DOCUMENTS

| | | | | |
|---|---|---|---|---|
| 1,751,721 A | * | 3/1930 | Bellmann | E04H 6/44 414/233 |
| 3,162,404 A | * | 12/1964 | Squire | B64F 1/00 244/114 R |
| 3,541,743 A | * | 11/1970 | Kness | B64F 1/00 14/71.5 |
| 3,675,378 A | * | 7/1972 | Neumann | E04H 6/44 414/231 |
| 3,833,138 A | * | 9/1974 | Dean | B64F 1/222 108/57.17 |
| 3,915,319 A | * | 10/1975 | Fairburn | E04H 6/44 187/266 |
| 6,279,855 B1 | * | 8/2001 | Domer | B64F 1/00 244/114 R |
| 6,315,243 B1 | * | 11/2001 | Peterson | B64F 1/00 244/114 R |
| 6,684,443 B2 | * | 2/2004 | Thomas | B64F 1/305 14/69.5 |
| 7,465,141 B1 | * | 12/2008 | Fournier | E04H 6/28 414/234 |
| 7,469,859 B1 | * | 12/2008 | Campbell | B64F 1/00 114/261 |

(Continued)

FOREIGN PATENT DOCUMENTS

GB    1445001 A  *  8/1976  ............... B64F 1/00

*Primary Examiner* — Babajide A Demuren

(57) ABSTRACT

The invention is directed to an integrated, multi-level airport terminal system with a plurality of cells disposed in an adjoining relation to one another. Each of the plurality of cells have a plurality of levels. At least one ramp member is disposed through each of the plurality of cells. The ramp member is disposed through an internal environment of each of the plurality of cells for transiting at least one aircraft through at least one cell of the plurality of cells in a sequential arrangement. Each of the plurality of cells are disposed in the adjoining relation to one another to define at least one row. At least one row is further disposed in a corresponding relation to at least another row. The invention is also related to a method of transiting at least one aircraft arriving in and departing out of the integrated, multi-level airport terminal system.

11 Claims, 10 Drawing Sheets

(56) References Cited

U.S. PATENT DOCUMENTS

| | | | | |
|---|---|---|---|---|
| 2002/0104176 A1* | 8/2002 | Thomas | ................... | B64F 1/305 |
| | | | | 14/71.5 |
| 2006/0038069 A1* | 2/2006 | Cawley | ..................... | E04H 6/44 |
| | | | | 244/114 R |
| 2011/0010912 A1* | 1/2011 | Bausen | ................. | B64F 5/0009 |
| | | | | 29/428 |
| 2014/0010619 A1* | 1/2014 | Dor-El | ....................... | E04H 6/22 |
| | | | | 414/240 |
| 2014/0252168 A1* | 9/2014 | Brody | ....................... | B64F 1/00 |
| | | | | 244/114 R |
| 2015/0008286 A1* | 1/2015 | Cox | ......................... | B64F 1/30 |
| | | | | 244/137.2 |
| 2015/0329219 A1* | 11/2015 | Soederhuizen | ........... | B64F 1/00 |
| | | | | 244/114 R |
| 2016/0319500 A1* | 11/2016 | Brody | ....................... | B64F 1/00 |

\* cited by examiner

INTEGRATED, MULTI-LEVEL AIRPORT TERMINAL SYSTEM

CLAIM OF PRIORITY

There is no known claim for priority for this U.S. Non-Provisional application.

BACKGROUND OF THE INVENTION

Field of the Invention

This invention generally relates to airports, and more specifically, an integrated, multi-level airport terminal system and method for improving airline passenger and cargo transit operations.

Description of Related Art

The aviation industry is extremely dynamic and competitive. As the globalization of business and trade continues to grow, air travel is increasingly paramount for the development of our global economy. However, despite the progressive demand, innovative designs and operational protocols of today's airports have been unable to rise to the most difficult of the airline passenger challenges, that of increasing capacity. No matter which airport one arrives or departs from, present-day airports are becoming overwhelmingly crowded due to numerous factors. In fact, with the current pace of travel, many airports around the world are expected to exceed their maximum capacity within the next five years. As such, airports with capacity limitations are undoubtedly causing drastic inefficiencies, which are detrimentally affecting our global economy.

The current infrastructure and operations of airports causes delayed flights, along with weather. Statistics at one Brazilian airport indicates that just 41 percent of all flights leave on time, and only 59 percent of flight arrive on schedule. A delayed flight has the potential to cost millions of dollars to businesses, as the flights arrival is also delayed, due to slot availability, not to mention the valuable time wasted during an extended travel schedule. Specifically, a delayed flight impacts passengers by having them negotiate through various security checkpoints, relocating gate changes and the associated reissuing of boarding passes. There are bottlenecks of people everywhere, within the airport terminal, the tunnels between terminals, at every security checkpoint, and baggage claim areas. Not surprisingly, it turns out that airport operations are not always in sync with passengers, airport authorities and airline activities, especially as the flight departure delays in one country's airport system average 54.2 minutes across ten airlines in 2014. The fact that passengers are routinely forced to suffer in deadlocked security lines, unannounced gate changes, "last call" announcements, and ultimately, flights not leaving as scheduled or cancelled altogether, as in the case of one airport system where the average of two percent represented 44,094 cancelled flights in 2014, is simply unacceptable.

An airport terminal system is one of the key elements within the airport's overall environment. The relationship of the airport terminal to the airport is similar to one that commercial buildings have with a modern-day city. Specifically, airport terminals include complex operations between airlines, airport authorities, and passengers. Growing inefficiency caused by growing capacity (World passenger traffic increased by 6.1 percent in 2015 according to Airports Council International ACI) impacts operations and highlights antiquated methodologies causing more and more passengers to become regularly frustrated. Even the most formidable, sophisticated airport hubs like Heathrow Airport in London are experiencing severe congestion and flight delays. Passengers at Heathrow are required to traverse unreasonable distances between concourses, ticket controls, customs and immigration, public transportation and security lines. The growth of other megacities like New York, New Delhi and Beijing are also encountering similar airport challenges.

Furthermore, the aviation industry trend suggests that more and more airline companies are looking to increase the size of aircraft to include more amenities for passengers and provide non-stop flights for high traffic, high volume international destinations. Accordingly, Airbus®, the European aircraft company has been manufacturing the A380, a double-deck, wide-body, four-engine jet airliner at a steady rate. It is the world's largest passenger airliner. Airlines like Qantas® and Emirates® are making significant investments to make the A380 a flagship of their respective fleets. However, despite the continuing demand, major airport hubs around the world have provided minimal infrastructure to accommodate the large wide body aircraft.

The issue for larger aircraft apart from their size, is the restrictive airport taxing space and terminal ramp space. At most of the world's larger airports, provisioning space to accommodate the A380 has been inhibited by, the legacy designs themselves, and delayed investment decision making. Accordingly, in order to smooth the process of enplaning and deplaning the aircraft, Airbus® strategically provided multiple access doors for both lower and upper cabins. On reflection, enplaning/deplaning the 69 passengers on the upper deck of the Boeing B747-300 (1983) was via a staircase, as only emergency doors existed for the flight crew at that level. Moreover, even if the airport itself is built to take on the double deck aircraft, the process of ticketing, checking luggage and security screening of so many people can be a logistical nightmare for current airport terminal operations since the larger wide body aircraft are positioned at the end of a pier or satellite building, away from all central services.

Larger aircraft like the A380 are also primarily designed to serve international flights. As such, if weather or scheduling problems were to force two or more A380s to arrive somewhere at the same time, airports estimate that current standards in airport terminal operations could take hours for every passenger to be processed and connect with their luggage. Similar problems were also encountered, when the Boeing® B747 was first introduced in 1969. Comparatively, the A380's introduction fared better in 2007.

Therefore, in order to alleviate the aforesaid issues, a number of airport systems and their related methods have been developed to improve airports, and more importantly, solve outstanding problems related to airport terminal operations, infrastructure, and integration. One such airport system is a multilevel aircraft infrastructure having a separate aircraft landing and takeoff runway strips with passenger and cargo movement facilities as a single, consolidated building. Specifically, the airport system incorporates a landing strip on the roof of the structure, an elevator to physically transport the aircraft to lower levels for passenger boarding, maintenance, and fueling operations. However, this airport system is not sufficiently integrated to improve airport operations. Specifically, aircraft elevators are impractical for commercial aviation facilities. The airport system also increases problems related to airline and passenger safety, increases delays in flight times and increases costs by, requiring complete transformation of current airports, and additional machinery and devices. Accordingly, the airport system has many impractical features that do not solve issues related to integration of aviation operations born by the current legacy designs of airport terminals.

Another airport system includes a covered construction featuring elongated runways with walls, positioned next to each other with adjacent taxiways and loading docks. The runways are positioned over the airport terminal with other portions of the airport. However, the closely positioned runways in relation to portions of the airport terminal buildings vastly threatens aircraft and passenger safety. Specifically, having closely positioned runways on top of airport facilities will promote aircraft related accidents. The airport system also fails to relieve issues related to airport operations, integration of airport terminal facilities and passenger/aircraft congestion. Accordingly, the airport system has many impractical features that do not solve issues related to integration of aviation operations.

Another airport terminal includes a radial shaped structure having subterranean levels. Although this airport terminal includes subterranean levels, it has means for elevating an aircraft in between the levels via a lift sled. Having a lift to elevate an aircraft within the aviation system is impractical. Moving an expensive aircraft containing numerous passengers involves unnecessary movements. This can easily prove to be a major safety hazard to aircraft and passengers alike. Specifically, the lift can easily malfunction or completely stop working, causing delays and passenger paranoia. Passengers could be stuck in the aircraft for hours. Furthermore, having to physically move a multi ton, multi million-dollar aircraft via a lift can be highly arduous, expensive, and would require drastic changes to airports worldwide. Essentially, this airport system has many impractical features that do not solve issues related to integration of airport operations.

Yet another airport system is disclosed, which comprises passenger areas and hangar areas in a multi-level building. While this system has multi-levels by having hangar areas adjoining the passenger areas, the system does not disclose how aircraft would be effectively moved into the hangars. Specifically, the airport system does not disclose sequencing of plurality of aircraft directly within the airport terminal building itself. As such, aircraft would have to be stored in the hangar in no particular order or orientation. Having to store multiple commercial aircraft of large dimensions in the hangar facilities would also require acres of additional space. Furthermore, the aircraft have to be stored in separate hangar areas, wherein the passengers do not have direct access to the aircraft for enplaning and deplaning purposes. The hangar areas require a portal, which provides access for aircraft from an apron outside the airport building, not within it. Accordingly, the airport system has many impractical features that do not solve issues related to integration of airport operations, beyond today's experience.

There is yet another airport system which comprises an "aeroplane" hangar with multiple stalls connecting to a central space. However, the hangar is a stand-alone single level structure, not a multi-level structure promoting integration of airport operations. The structure further requires the fuselage of the aircraft be moved into the central space for major repairs, and not within the same building. Accordingly, the airport system has many impractical features that do not solve issues related to integration of airport operations.

Therefore, the aviation industry is in a dire need of an integrated, multi-level airport terminal system, and method to help eliminate current issues, improve operations, lower costs, increase profits, alleviate congestion, promote safety and security, and meet the future demands of aircraft frequency. If an integrated, multi-level airport terminal system were developed, it would be structured in a manner which overcomes issues and/or disadvantages of the type set forth above or otherwise known to still exist in this field of art. Accordingly, if such an integrated, multi-level airport terminal system and method were to be developed, it would facilitate seamless integration of airport operations without the need of additional expensive devices or drastic restructuring of the status quo. Ideally, if such an integrated, multi-level airport terminal system and method were to be developed, it would incorporate structural and operational features, which would facilitate effective taxiing, routing, accommodation, enplaning/deplaning and servicing of aircraft of any size, including, but not limited to the larger sized, 600-plus commercial passenger aircraft. Essentially, if such an integrated, multi-level airport terminal system and method were to be developed, it would incorporate structural and operative features, which would facilitate improvement in landside, airside, and transportation systems in and out of airports. Finally, any such integrated, multi-level airport terminal system and method, if developed, would also be preferably structurally and operably reliable, while still remaining cost effective to implement, in order to facilitate widespread use and acceptance throughout the aviation industry worldwide.

SUMMARY OF THE INVENTION

The present invention is intended to present a solution to the aforementioned operational needs as well as the growth driven capacity needs, which remain in the relevant field of art. As such, and for purposes of clarity in describing the structural and operative features in at least one preferred embodiment, the present invention is directed to an integrated, multi-level airport terminal system. The integrated, multi-level airport terminal system does not discriminate against aircraft in relation to their orientation, structure, dimension or other similar factors. However, while the aircraft transiting into the integrated, multi-level airport terminal system may vary based on several aforesaid factors, the present invention is well-suited for commercial airlines, including but not limited to the Boeing® B777 aircraft and the larger, 600-plus passenger, commercial aircraft such as the A380 built by Airbus®. Conversely, the integrated, multi-level airport terminal system can also be within a much smaller executive airport environment. As such, in this smaller environment, the airport terminal system has the structural and operative features to compliment smaller personal and business jets.

Moreover, the integrated, multi-level airport terminal system of the present invention builds upon the legacy designs of current airports, and would therefore, present little difficulty for today's architects, designers and builders to construct it in a reasonable amount of time, and at a relatively inexpensive cost. The integrated, multi-level airport terminal system also does not necessitate the addition of external supporting devices or apparatus to manipulate the positioning of transiting aircraft. Specifically, the present invention does not require the unwarranted hassle of having to manipulate the overall position or orientation of the arriving or departing aircraft. This preserves transiting times and allows flights to stay on course as far as timely arrivals and departures are concerned. Therefore, the integrated, multi-level airport terminal system does not require the help of rails, escalators, elevators, or other external means to support the orientation or positioning of transiting aircraft.

As will be described in greater detail subsequently herein, in one of the several preferred embodiments, the integrated, multi-level airport terminal system includes a plurality of cells. At least some of the cells of the plurality of cells are disposed in an adjoining relation to one another. The adjoining relation of cells in relation to each other allows the cells positioned next to each other to remain within a close relation supporting the integrated characteristics of the airport terminal system. The adjoining relation of cells to each other contributes towards successful transit of arriving and departing aircraft through each of the cells' internal environments as well. Furthermore, the adjoining relation of the plurality of cells in relation to each other define at least one row. Each row can include a set of two adjoining cells, or alternatively, in one of the many preferred embodiments, a set of four adjoining cells. The precise determination in the number of adjoining cells within at least one row can be based on several factors. These factors may include, but are not limited to transiting traffic of the airport, the size of the airport, transiting requirements of arriving and departing flights, number of originating flights, number of transfer flights, amount of passengers, etc. However, there is no limitation whatsoever as to the number of cells that the integrated, multi-level airport terminal system may include.

In one of many other preferred embodiments, the integrated, multi-level airport terminal system may include any given number of cells. To merely illustrate as an example, the plurality of cells may include four cells, each cell disposed in an adjoining relation to one another. The adjoining relation of each cell to each other defines at least one row. The at least one row of four adjoining cells may be further disposed in a corresponding relation to another row of four adjoining cells. In other words, the set of four adjoining cells within one row may be in a corresponding relation to a set of four adjoining cells within another row. As such, the integrated, multi-level airport terminal system may include sixteen cells. The sixteen cells can be apportioned into four rows. Each row may include four cells. Each of the four cells may be further disposed in an adjoining relation to one another. Each cell of the four cells defining at least one row may also include structural and operational features. These features can sufficiently provide transiting services to at least one aircraft while it transits and accommodates within the internal environment of each cell. In addition, the features afforded within each cell can include, but is not limited to services for passenger-handling, passenger-transfer, aircraft cabin, ramp, catering, baggage handling, aircraft re-fueling, aircraft maintenance, aircraft repair, engineering, cargo-handling, aircraft towing, aircraft marshalling, aircraft load control, and diverted aircraft transiting.

The adjoining relation of cells in relation to one another may also allow at least one aircraft to transit through the internal environment of the cells within the row. More specifically, the adjoining position of each cell in relation to the other within the row may allow the aircraft to transit and move from the internal environment of one adjoining cell to the internal environment of the next adjoining cell. Alternatively, in one of the other preferred embodiments, the adjoining relation of each cell in relation to one another may also allow a plurality of aircraft to transit contemporaneously. In particular, the adjoining relation of each cell in relation to another allows a plurality of aircraft to successfully transit through the internal environments of each of the adjoining cells within the same row. For instance, at least one aircraft is transited through the internal environment of one of the plurality of cells, wherein all the operational processes related to the transiting aircraft are sufficiently completed. As such, each cell can comprehensively include all of the transiting aircraft related processes, thus allowing to transit multiple aircraft within each of the cells simultaneously.

Alternatively, in one of the other preferred embodiments, each cell may comprise of specific operational processes only. As such, one of the adjoining cells can include structural and operative features supporting deplaning and enplaning of passengers. The second next adjoining cell to that one cell within the same row can include structural and operational features related exclusively to cargo handling. The third next adjoining cell to that second cell within the same row can include features related to fuel, maintenance, cabin, or catering. Accordingly, each adjoining cells within each row may include specific structural and operational features that provide only certain aircraft transiting services within each of their internal environments.

In yet another one of the many preferred embodiments, each adjoining cell within each row can comprehensively include all the structural and operational features sufficient to transit at least one aircraft. As such, each adjoining cell may include all the aforesaid structural and operational services within its internal environment. Specifically, services such as cargo, deplaning of passengers, enplaning of passengers, catering, fuel, maintenance, etc. can all be executed within the internal environment of one cell. In this embodiment, therefore, the aircraft would satisfy all of its transiting requirements not requiring any movement from the internal environments of multiple cells with the row. Accordingly, regardless of the plurality of preferred embodiments as stated herein, the adjoining relation of each cell in relation to one another along with the corresponding relation of one row in relation to another row may greatly contribute towards the integrated characteristics of the integrated, multi-level airport terminal system. Each of the plurality of cells of the integrated, multi-level airport system further includes a plurality of levels. The plurality of levels may include several levels including, but not limited to at least— underground level, ground level, first level, second level, third level, fourth level, fifth level, etc. Each level of the plurality of cells can be customizable based on the operational needs of the airport. Each level within each of the plurality of cells can be designated for a specific or multiple operational areas, which contribute towards the integrated aspect of the present invention. Examples of operational areas on each respective levels may include, but are not limited to upper boarding area, lower boarding area, ticketing area, duty free shops area, customs and immigration clearance area, kid's area, chapels, airline operations, administration, arrival gates, arrivals area, storage area, baggage claim area, mechanical services area, public transportation area, etc. As aforesaid, each of the areas on each level can be utilized for one or more operational processes directed towards transiting aircraft.

Furthermore, while there is no limitation on the number of levels the present invention may have, in one of the many preferred embodiments, the plurality of levels may include a ground level incremented by five additional levels and at least one underground levels below the ground level. The number of levels can vary and depend on several factors. These factors may be based on operational demands of the airport, airport space, passenger traffic, number of transiting flights, number of originating flights, costs, aviation safety codes, laws of different countries, etc. For instance, the ground level of the present invention can be specifically structured and disposed for accommodating and transiting the entire aircraft, whereas other levels can be utilized for other transiting aircraft related operational processes. The first level or one of the lower levels of the cell on the "port side" of the aircraft can be used as departure area primarily for enplaning passengers on one side of the lower level of the aircraft. Conversely, the first level of the cell on the other side of the cell, can also be utilized as a designated arrivals area on the "starboard side" of the aircraft primarily for deplaning passengers from the lower level of the aircraft.

Similarly, each of the other levels of the integrated, multi-level airport terminal system can be disposed on each side of the transiting aircraft within the internal environment of at least one cell. Having levels disposed on either side of the transiting aircraft with the internal environment of at least one cell allows for more efficiency in many of the aircraft transit related operational processes. For example, by enplaning and deplaning passengers on either (port or starboard) side of the aircraft on each side of the first level or other lower levels can promote efficiency in operational processes, including improvement in transiting times of aircraft, lower transiting costs, and decrease in ramp time for the aircraft at the airport terminal. Moreover, the plurality of levels may also be disposed below the ground level. Specifically, in one of the many preferred embodiments of the present invention, the plurality of levels may include at least one underground level, below the ground level, within each of the plurality of cells. The underground levels can be utilized for several other operational processes including, but not limited to baggage claim areas, ground transportation areas, passenger arrival pickups, etc.

The integrated, multi-level airport terminal system also includes a plurality of movable connectors disposed on at least one of the lower levels of at least one cell and on at least one of the upper levels of at least one of the plurality of cells. Some of the movable connectors are positioned on the lower levels of at least one cell within its internal environment. Some of the other movable connectors are positioned on the upper levels of at least one cell within its internal environment. The movable connectors can be integrated within at least one cell, allowing for connectivity with the aircraft, while it is transiting within the internal environment of at least one cell. Additionally, the movable connectors are structured and disposed on the lower and upper levels of at least one cell to provide at least temporary connectivity with the lower and upper levels of the transiting aircraft. The position of each of the movable connectors on each level also allows for accuracy in connectivity with the lower and upper levels of the transiting aircraft. The movable connectors are also disposed in a temporarily connecting relation with the interior environment of the transiting aircraft, on each side of the aircraft, namely, the starboard or port side, on the lower and upper levels of at least one cell. As such, the movable connectors can connect at least temporarily with each of the exit or entrance doors on the lower and upper levels of the transiting aircraft, all within the internal environment of each of the cells.

Each of the plurality of movable connectors are disposed in a communicating relation with each one of a plurality of aircraft seating zones of the transiting aircraft for allowing passengers to move between the transiting aircraft and lower and upper levels of at least one cell. In one of the many preferred embodiments, the movable connectors are temporarily connected with a plurality of openings on each of the starboard or port side of the transiting aircraft and each of the lower and upper levels of the transiting aircraft. The plurality of openings may include exit and entrance doors of the transiting aircraft. So, when the movable connectors are temporarily connected with the openings, the movable connectors are structured and disposed to communicate with each of the plurality of aircraft seating zones of the transiting aircraft, allowing passengers to freely move between the transiting aircraft and each of the lower or upper levels of at least one cell. In other words, each of the movable connectors allow passengers arriving into or departing from various aircraft seating zones within the interior of the transiting aircraft to move freely between the arrivals area or departures area located on the lower and upper levels of at least one cell. Specifically, each of the plurality of aircraft seating zones are determined by the designated seating positions of the passengers. So then, when the movable connectors are temporarily connected with the plurality of openings (exit or entrance doors) on each of the lower and upper levels of the transiting aircraft and communicate with the interior or interior environment of the transiting aircraft, the arriving or departing passengers can move freely through the movable connectors between the interior environment of the transiting aircraft and each of the levels of the cell.

Additionally, the arriving or departing passengers can also be directed through specific movable connectors on each level of the aircraft based on the designated aircraft zones determined by the location of their seats within the transiting aircraft. For instance, and merely as an example, seating numbers 1-15 can be designated to aircraft seating zone one. The passengers exiting the transiting aircraft within the designated aircraft zone would depart the aircraft, moving through the movable connector connected and communicating with the exit or entrance door nearest to the aircraft seating zone, leading onto the arrivals area on one of the lower or upper levels of the cell. Similarly, the passengers inside the departures area on one of the lower or upper levels of the cell would move through the movable connectors designated for the aircraft seating zone one, entering into the transiting aircraft to claim their seats from the seating numbers 1-15. The entering passengers from the departures area of one of the lower or upper levels of the cell would enter into the transiting aircraft through the movable connectors disposed on the lower or upper levels of the cell on the port side of the aircraft. However, to exit out, passengers of the transiting aircraft would motion through the movable connectors disposed on the lower or upper levels of the cell on the starboard side of the transiting aircraft onto the arrivals area of one of the lower or upper levels of the cell. In one of many other preferred embodiments, in which the integrated, multi-level airport terminal system is part of a smaller executive airport environment, the movable connectors can be structured to move the passengers from the lower level to the waiting business jet aircraft to its lower height. This can be achieved by an articulation of the movable connector, or stairs to connect passengers and the business jet aircraft as seamlessly as possible.

Further, the integrated, multi-level airport system also includes at least one ramp member. Each of the ramp members are connected to the landing and takeoff taxiways or runways of the integrated, multi-level airport terminal system. The connectivity of the taxiways and each of the ramp members contributes towards a smooth transition when the aircraft is transiting in and out of the integrated, multi-level airport terminal system. Accordingly, when an aircraft arrives at the airport terminal system, it typically taxis on the runway or other taxiways until the aircraft is guided to at least one of the ramp members by the airport terminal's ground control authorities. The determination of a precise ramp member the aircraft will be directed towards is made by the ground control authorities depending on numerous factors. These factors may include, but not limited to boarding times of aircraft, landing times of aircraft, transfer times of aircraft, overall aircraft traffic within each cell, etc. Additionally, at least one of the ramp members is disposed through each of the plurality of cells for transiting at least one aircraft through at least one cell.

More specifically, at least one ramp member is disposed through an internal environment of each of the plurality of cells for transiting the aircraft. The ramp member is structured and disposed to serve as the aircraft approach to route through the internal environment of at least one cell, allowing the entire aircraft to successfully accommodate within the internal dimensions of each of the plurality of cells and effectively transit therein. As such, each of the cells are structured and configured to accommodate and transit aircraft of all sizes, from the larger sized A380 aircraft to small business or personal jets. The structure of the cell does not discriminate against the size and type of the aircraft and can adopt to accommodating and transiting a plurality of aircraft present within the industry.

Accordingly, in one of the many preferred embodiments of the present invention, the ramp member is disposed through the internal environment for transiting at least one aircraft through at least one of the plurality cells in a sequential arrangement. The sequential arrangement in which the aircraft transit through the integrated, multi-level airport terminal system depends on ramp member time, transit time, status of the aircraft (originating or transiting), space availability of cells, position of other transiting aircraft within each of the plurality of cells, etc. Additionally, the sequencing arrangement allows the aircraft disposed on the ramp member to transit from one cell to another, thus allowing the aircraft to enter into the internal environment of the designated cell within the row. For instance and merely as an example, if there are four cells in a row, and the aircraft has been authorized by the ground control into cell number three within the row, the aircraft can be thereby guided by entering into the internal environment of the first cell at the end of the row, move through the internal environment of first cell, enter into the internal environment of the second cell, adjoining the first cell within the row, move through the internal environment of the second cell, and then enter into the internal environment of third cell adjoining the second cell within the row, thereby finally transiting into the third authorized cell.

The transiting position of the aircraft in the third cell within the row is authorized by the ground control authorities depending on several aforesaid factors. As such, the aircraft is sequenced within the third cell of the row depending on its departure time. In other preferred embodiments, there may be no transiting aircraft in other cells within one of the rows and the aircraft may simply be transiting within one of the four cells within the row based on other factors including the possibility that the aircraft maybe an originating aircraft or a terminating aircraft from the integrated, multi-level airport system.

The integrated, multi-level airport terminal system further includes a roof member. The roof member is structured and disposed on each of the plurality of cells for arrangement from a landside direction of the integrated, multi-level airport terminal system to an airside direction of the integrated, multi-level airport system. In other words, the roof member flows in a wave like arrangement from the landside area of the integrated, multi-level airport terminal system to the airside area of the integrated, multi-level airport terminal system. More specifically, the airport terminal system is divided into landside and airside areas. The Landside areas include parking lots, public transportation, train stations, natural landscape, and access roads. Airside areas include all areas accessible to aircraft, including runways, taxiways and aprons. Structurally, the roof member has a provision for natural top light to penetrate the lower levels and the upper levels of the integrated, multi-level airport terminal system, giving great visibility in all directions of each cell.

The roof member is further structured to have clear panels disposed throughout the roof member, giving passengers spectacular views of the integrated, multi-level airport terminal system, take-off and landing of aircraft, as well as the transiting of aircraft at respective arrival and departure areas or gates. The roof member is insulated against hot and cold outside air temperatures to reduce the air-conditioning and heating loads, while providing efficient thermal control of the integrated, multi-level airport terminal system. The roof member's insulation also assists in meeting the zero carbon standard required with the internal environment of the airport terminal system. Furthermore, in one of the many other preferred embodiments, the roof member incorporates solar panels converting natural sun light into useful energy, supplementing the airport terminal's energy source, thereby reducing the demand for an electric source. Additionally, the roof member is structured and disposed to have an overhang member on each cell on the landside of the airport terminal system for providing shade to all of the transparent frontage of each cell of the integrated, multi-level airport terminal system. The overhang member is also structured to reduce the overall temperature of the internal environment within each of the cells during hot hours of the day.

In one of the many preferred embodiments, the method of transiting at least one aircraft in and out of an integrated, multi-level airport terminal system includes determining the transiting requirements of at least one aircraft arriving on a runway. Particularly, the airport traffic control and tower authorities determine the transiting requirement of the aircraft arriving at the integrated, multi-level airport terminal system prior to its arrival, and forward all the information to the appropriate personnel of the control tower. The authorities also directly communicate information regarding the cell allocation at the integrated, multi-level airport terminal system with the flight crew of the aircraft, prior to its arrival. Additionally, the transiting requirements of each of the arriving aircraft is typically synchronized with the ground control, and ultimately to each of the cell's self docking system. These actions initiate the transiting requirements of the aircraft within each of the cells. There are several other factors that contribute towards cell allocation, including, but not limited to whether the aircraft has a final destination at the airport terminal system, if the aircraft is a transfer flight, requiring a quick turnaround with only embarking and disembarking of transfer passengers and a quick refueling as part of its transiting requirements, if the aircraft is a commercial aircraft or a small business jet, or alternatively, if there are other exigent circumstances that has mandated landing of the aircraft at the integrated, multi-level airport terminal system.

The method of transiting at least one aircraft in and out of an integrated, multi-level airport terminal system further includes ascertaining the positions of other aircraft transiting through each one of a plurality of cells. Accordingly, ascertaining the positions of other aircraft transiting through each one of the plurality of cells further includes determining the transiting positions of each aircraft within the internal environment of each one of the plurality of cells for the aircraft to transit therein, authorizing at least one cell of the plurality of cells for the aircraft to transit, determined by the cell availability and the transiting requirements of the aircraft and communicating the availability of at least one cell of the plurality of cells with ground personnel to facilitate aircraft transit therein. More specifically, once the ground control and flight operations authorities determine the transiting requirements of the arriving aircraft, the position of each of the other transiting aircraft within the airport terminal system is ascertained. Furthermore, an airport surface detection equipment (ASDE) locates precisely the positions of each transiting aircraft within the internal environment of each of the cells using a graphical display. The ground control and flight operations authorities are equipped with a search radar, which graphically displays each transiting aircraft within each cell of the integrated, multi-level airport terminal system. In addition, the authorities utilize a tower automated ground surveillance system (TAGS), which displays the position of each aircraft from a signal transmitted by each aircraft. The signal reveals details of each aircraft including each unique flight identifier in real time within each of the cells of each row of the airport terminal system.

The method of transiting at least one aircraft in and out of the integrated, multi-level airport terminal system also includes guiding the at least one aircraft on a ramp member through an internal environment of at least one cell of the plurality of cells. Each cell within each defined row of the airport terminal system can be marked or numbered in a distinct manner, allowing the ground control and operations authorities and aircraft personnel to effectively communicate the position of the cell within the integrated, multi-level airport terminal system. Once the communication is effectively made, the aircraft can be successfully guided into the cell. While most aircraft are capable of facilitating ground movement on the taxiway under their own power, once the position of the cell for the transiting aircraft is determined and communicated with the aircraft personnel, the aircraft can be towed on the ramp member, disposed through the internal environment of the cell, with the aid of an external power. The external power may include, but is not limited to tractors, tugs, or other similar vehicles capable of using their power to successfully place the aircraft into motion and move it into its desired location on the ramp member.

Moreover, while guiding the aircraft through the internal environment of at least one cell, a sequential arrangement of transiting aircraft in and out of the integrated, multi-level airport terminal system is preferably maintained. As such, the method of guiding at least one aircraft includes utilizing a sequential arrangement to facilitate transit of at least one aircraft into the internal environment of at least one cell of the plurality of cells. More specifically, the sequential arrangement of the aircraft provides priority and organization of aircraft transiting into the airport terminal system. The sequential arrangement allows the aircraft to strategically position within each respective cell of each respective row based on several determining factors previously mentioned. The transiting aircraft are sequentially positioned within each cell of each row of the airport terminal system to avoid congestion and smooth flow of traffic within the airport terminal system. Additionally, the sequential arrangement of aircraft within the integrated, multi-level airport terminal system allows transiting aircraft to move effectively through each of the plurality of cells within the row from arrival, transit, and departure. For instance, the transiting aircraft with the quickest transiting turnaround typically may be sequenced in front of the aircraft with a relatively slower transiting turnaround and so on. Similarly, in another instance, a transiting aircraft, which is an originating aircraft (aircraft originating from the location where the airport terminal system is physically located) may be sequenced in a different cell of a different row of the airport terminal from a transfer aircraft (arriving from another airport of another city to the airport terminal system) having to merely refuel, and enplane and deplane transfer passengers on to their ultimate destination. Likewise, the sequential arrangement of the transiting aircraft with a quicker departure time maybe directed first out of the internal environment of the cell than the transiting aircraft with a slower departure time transiting behind the transiting aircraft with the quicker departure time. This efficiency in sequential arrangement promotes an ideal flow of transiting aircraft in and out of the integrated, multi-level airport terminal system. It also prohibits the possibility of unwarranted congestion even within the busiest of airport terminals around the world.

The method of transiting at least one aircraft in and out of the integrated, multi-level airport terminal system further includes facilitating the transiting requirements of at least one aircraft within the internal environment of at least one cell. More specifically, the transiting requirements can include, but are not limited to a plurality of operational process such as passenger enplaning and deplaning, cargo handling, cargo security, aircraft maintenance, aircraft fueling, baggage transfers, baggage handling, lavatory, cleaning, cabin, catering, airport terminal services, field operations, etc. Accordingly, when at least one aircraft is guided to the cell and transits into the internal environment of the cell, the transiting requirements commence within the cell's internal environment. Of course, the nature of the transiting requirements, including the operational processes therein are determined by status of the aircraft (destination, transfer or originating), ramp member times, size of the aircraft, type of aircraft, etc.

While the aircraft is transiting within the internal environment of at least one cell, the aircraft may also enplane and deplane passengers. For instance, while an originating aircraft, may have no passengers to deplane from the aircraft, a transfer aircraft may have several passengers, who need to enplane and deplane the transiting aircraft. Accordingly, the method of transiting at least one aircraft in and out of the integrated, multi-level airport terminal system includes utilizing a plurality of movable connectors disposed on an upper level and a lower level on each side of at least one cell for facilitating movement of passengers into and out of the at least one aircraft. Specifically, the movable connectors disposed on the lower and upper level of at least one cell allow passengers on the lower and upper level of the transiting aircraft to enplane and deplane without requiring the passengers on the upper level of the transiting aircraft to descend down to the lower level of the transiting aircraft, or alternatively, the passengers on the lower level of the transiting aircraft to ascend up to the upper level of the transiting aircraft.

Having movable connectors disposed on the lower and upper level of at least one cell allows passengers to enplane the aircraft from the upper level and lower level of the cell. The movement of passengers on the upper and lower level also decreases the overall enplaning and deplaning times of the transiting aircraft. Furthermore, the plurality of movable connectors are located on the starboard side or on the port side of the transiting aircraft. Accordingly, in one of many preferred embodiments, passengers can board the transiting aircraft from upper and lower level of the cell onto the upper and lower level of the aircraft from the port side of the aircraft. Conversely, the passengers can deplane from the upper and lower level of the transiting aircraft on to the upper and lower level of the cell from the starboard side of the aircraft. As such, having efficiency in enplaning and deplaning times minimizes the risk of flight delays and accommodates for extra time that the aircraft may need in other operational processes while transiting within the internal environment of the cell.

In one of the other many preferred embodiments of the present invention, the plurality of movable connectors temporarily connect on the starboard side or the port side of at least one aircraft for facilitating movement of passengers between the internal environment of the at least one aircraft and each of the levels on each side of at least one cell. Specifically, once the passengers have deplaned, only the service personnel have access to the plurality of movable connectors on the starboard side. Once the service tasks are completed, the plurality of movable connectors on the starboard side are withdrawn as part of immigration and security measures. Furthermore, each of the movable connectors allow passengers arriving into or departing from various aircraft seating zones within the interior of the transiting aircraft to move freely between the arrivals area or departures area located on the lower and upper levels of at least one cell and the interior of the transiting aircraft. The plurality of aircraft seating zones can be determined by the designated seating positions of the passengers. Accordingly, when the movable connectors are temporarily connected with the exit or entrance doors on each of the lower and upper levels of the transiting aircraft and communicate with the interior of the aircraft, the arriving or departing passengers can move freely through the movable connectors between the interior of the aircraft, and the departures or arrivals area located on each level of the cell, primarily based on the aircraft seating zones determined by each passenger's designated seat.

Once the transiting requirements on at least one aircraft within the internal environment of the cell are fully completed, the aircraft is authorized for departure by the ground control authorities. When the aircraft is ready for departure out of the integrated, multi-level airport terminal system, the method of transiting at least one aircraft in and out of the integrated, multi-level airport terminal system includes directing the at least one aircraft on the ramp member out of the internal environment of at least one cell of the plurality of cells for the aircraft departure. Particularly, the ground control and operations authorities determine the positions of other aircraft presently transiting through each of the plurality of cells. As such, the method of directing at least one aircraft on the ramp member out of the internal environment of at least one cell of the plurality of cells for the aircraft departure further includes determining positions of other aircraft transiting through each of the plurality of cells. Since multiple aircraft may be ready for departure simultaneously or within close proximity of times, it is necessary for the authorities to coordinate all movements of the aircraft within each cell of each row. Furthermore, safety is always a concern, so the authorities will ensure that there is a safe sequencing of aircraft at the integrated, multi-level airport terminal system. As such, the authorities determine the positions of other transiting aircraft within each of the cells within the rows. Each cell is equipped with proximity sensors to ensure safe clearance for departure. The aircraft can then proceed with the aid of external power such as tugs or tractors towards the airside of the integrated, multi-level airport terminal system in a sequential arrangement.

After the positions are verified and at least one aircraft is authorized for departure based on its scheduled departure time, the method of transiting at least one aircraft in and out of the integrated, multi-level airport terminal system further includes utilizing sequential arrangement to facilitate transit of at least one aircraft out of the internal environment of at least one cell. Specifically, in one of the many preferred embodiments, the aircraft with quicker transiting times will transit in a cell adjacent to the aircraft with slower transiting times. Accordingly, in one of the many preferred embodiments, the aircraft with similar transiting times may strategically transit in at least one cell of the row, with other like aircraft transiting within the same row. As such, the aircraft transiting times are accommodated by the sequencing of each cell and row. Therefore, the aircraft can safely move out of the internal environment of the at least one cell, where it had been transiting towards the outside environment on the airside of the airport terminal system, where a plurality of runways for takeoff may be located.

Alternatively, in other preferred embodiments, the transiting aircraft may be located within the internal environment of the first cell within the row of four cells. As such, the transiting aircraft can be directed through the internal environments of each of the remaining three cells within the row, moving on the ramp member disposed in each of the cells, until the transiting aircraft reaches towards the outside environment on the airside of the airport terminal system, where a plurality of departure runways or taxiways may be located.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be made to the following detailed description taken in connection with the accompanying drawings in which.

DETAILED DESCRIPTION OF THE PREFERRED EMBODIMENT

Figure 1:
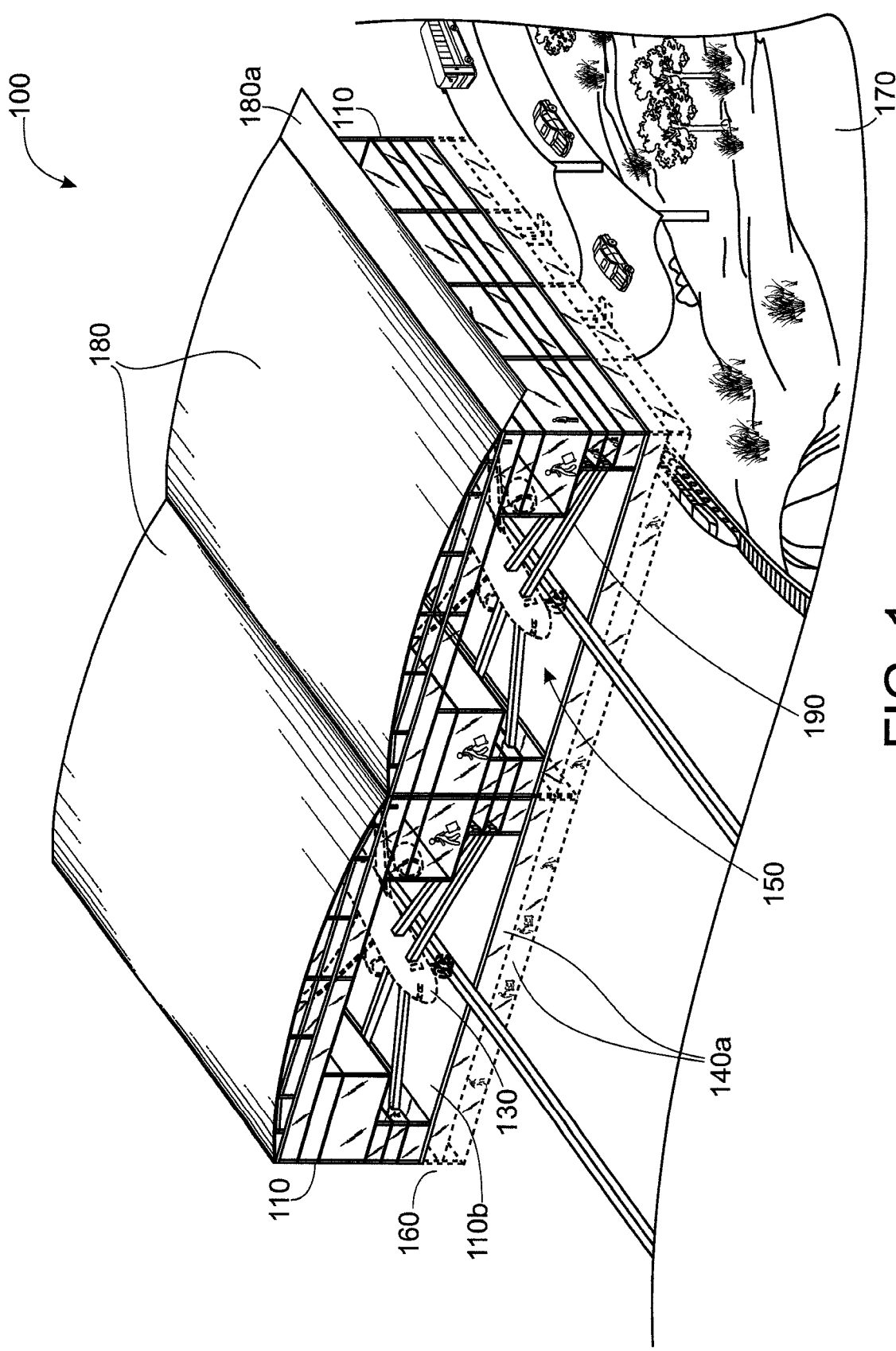
FIG. 1 is a perspective view of the integrated, multi-level airport terminal system in accordance to one of several preferred embodiments.

Like reference numerals refer to like parts throughout the several views of the drawings.

Figure 2:
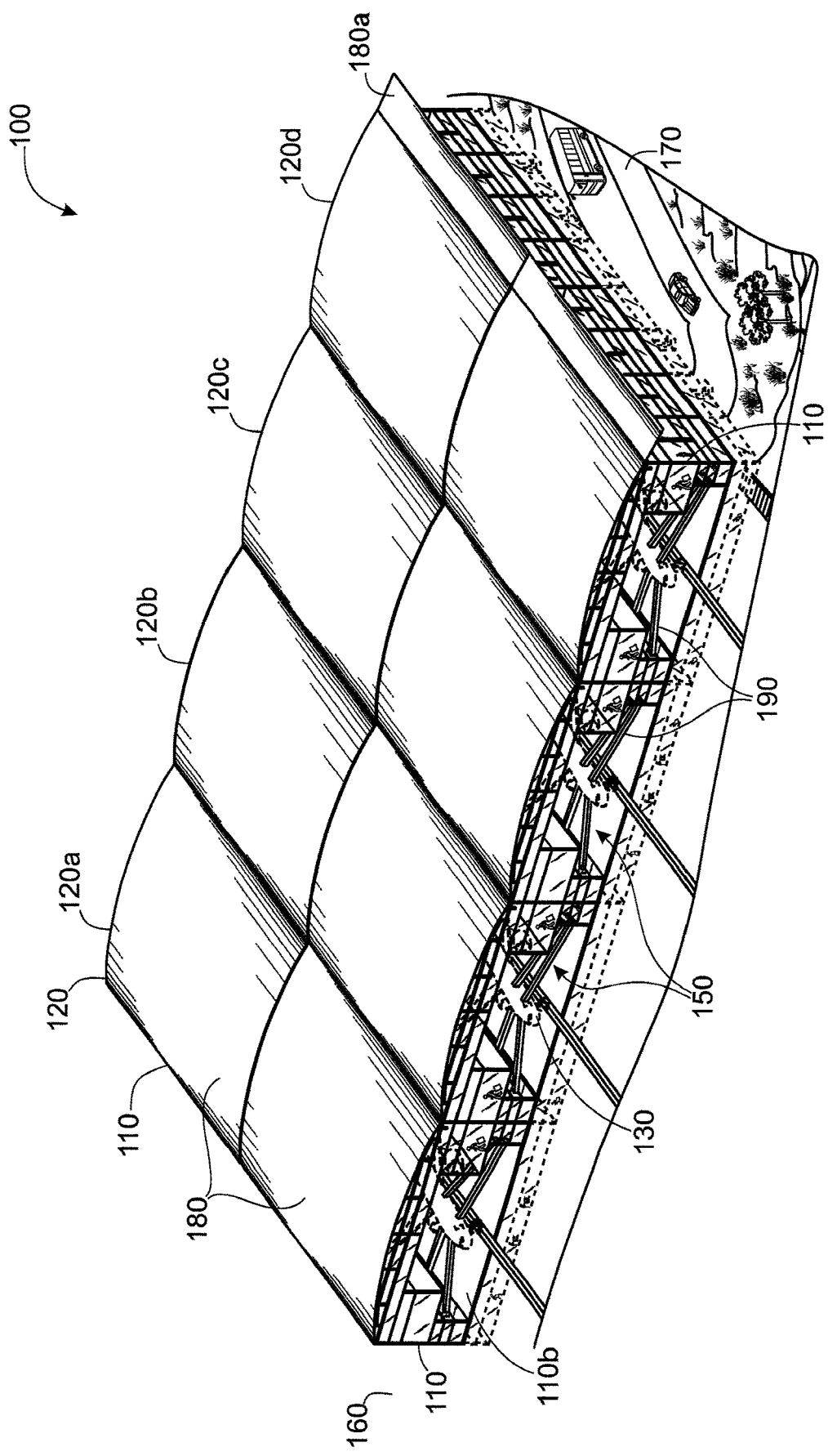
FIG. 2 is a perspective view of the integrated, multi-level airport terminal system in accordance to one of several preferred embodiments.
Figure 7:
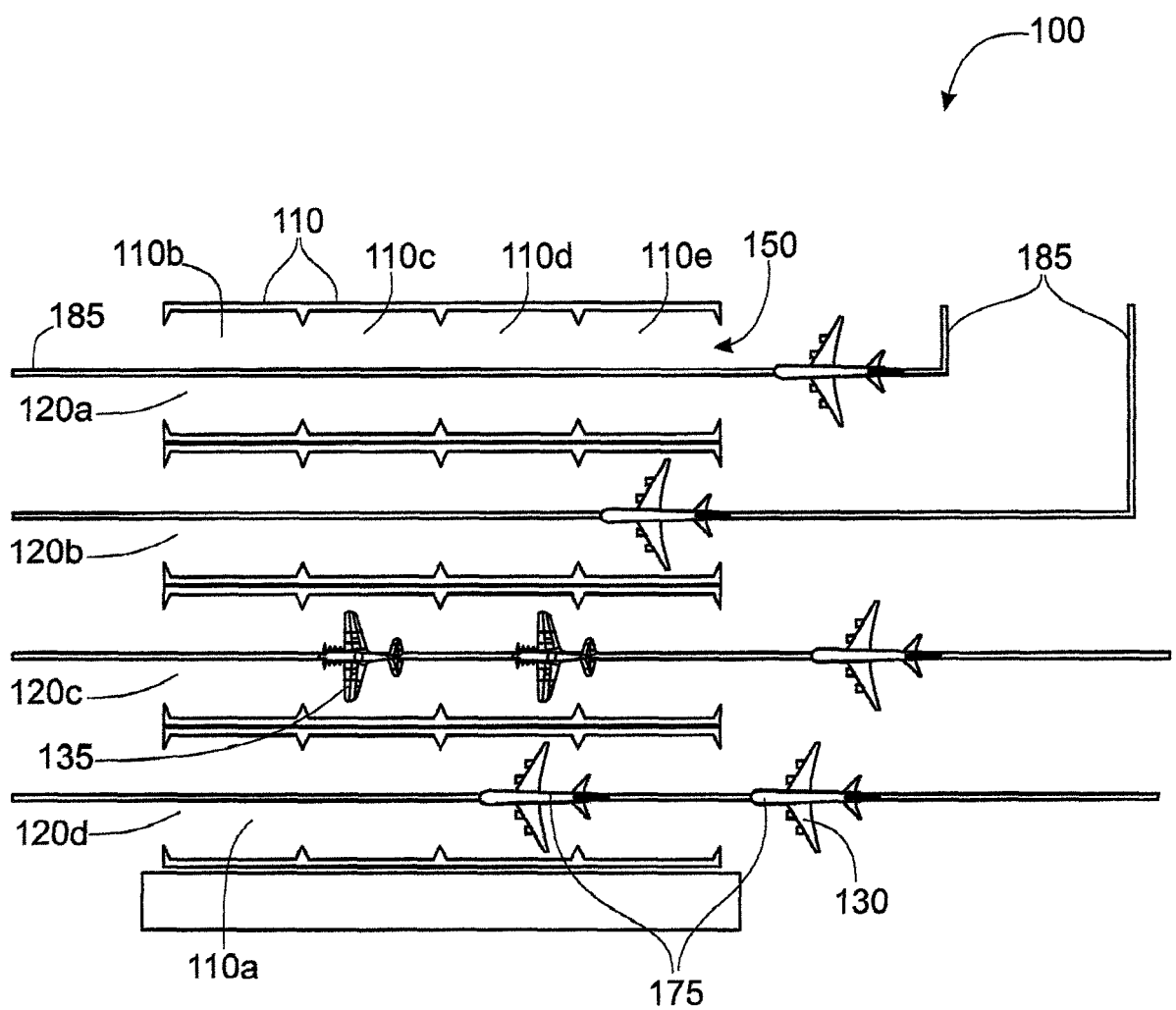
FIG. 7 is a schematic view of the integrated, multi-level airport terminal system in accordance to one of several preferred embodiments.
Figure 8:
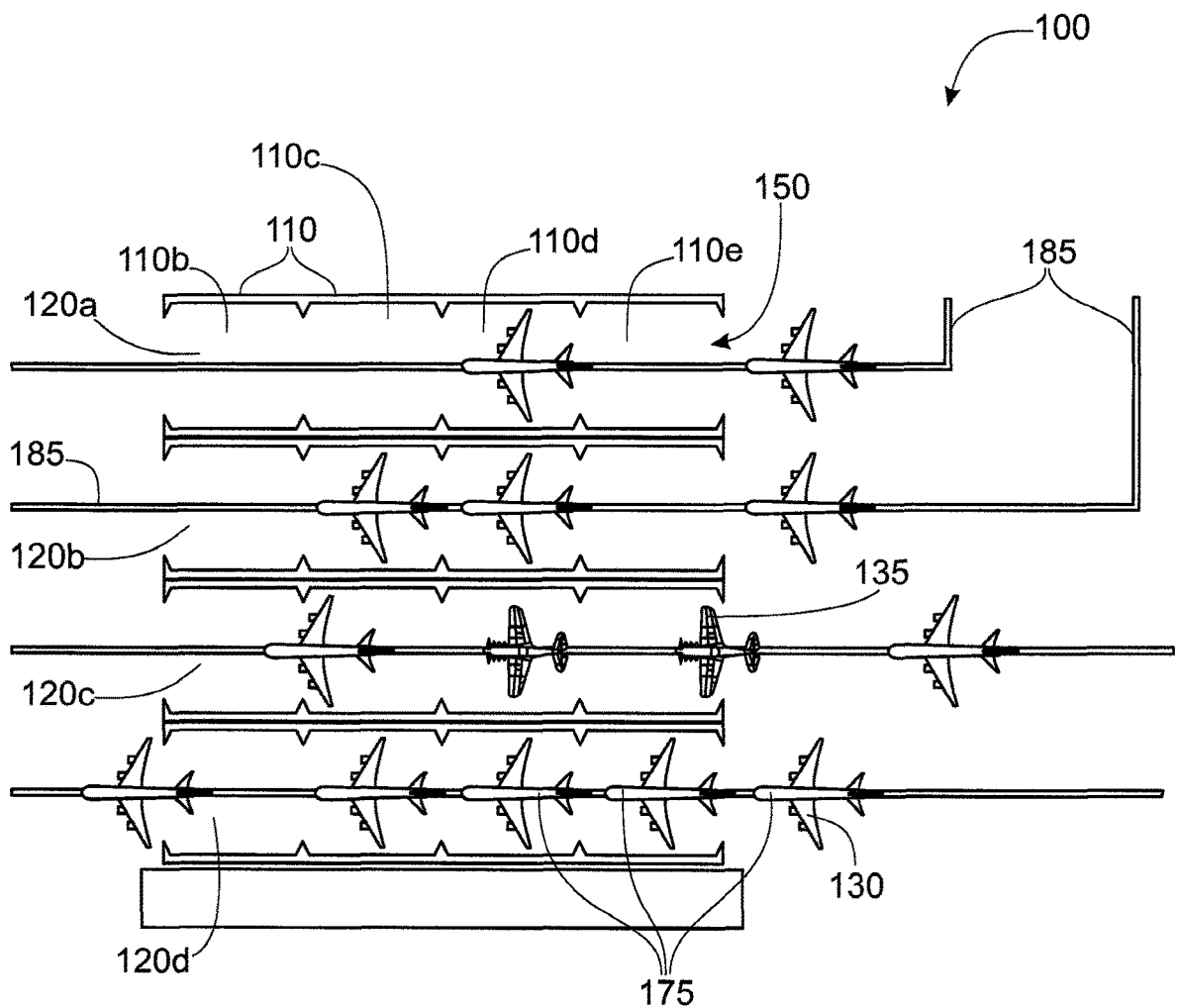
FIG. 8 is a schematic view of the integrated, multi-level airport terminal system in accordance to one of several preferred embodiments.
Figure 9:
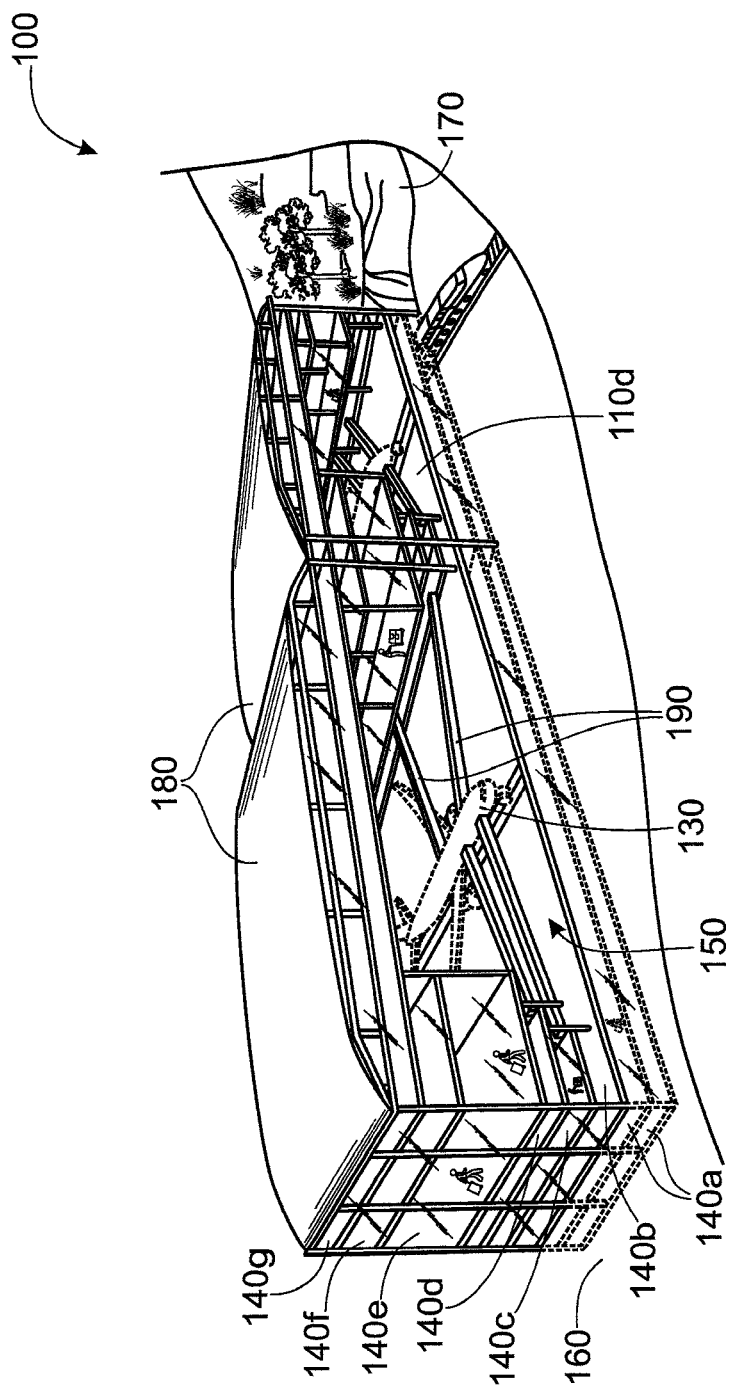
FIG. 9 is a perspective view of the integrated, multi-level airport terminal system in accordance to one of several preferred embodiments.

As shown in the accompanying drawings, the present invention of an integrated, multi-level airport terminal system 100 has a plurality of cells 110. More specifically, as illustrated in FIG. 1, at least two of the cells 110 of the plurality of cells 110 are disposed in an adjoining relation to one another. The adjoining relation of cells 110 with respect to each another allows the cells 110 positioned next to each other to remain within a close relation, supporting the integrated characteristics of the integrated, multi-level airport terminal system 100. Referring now to FIG. 2, FIG. 7 and FIG. 8, in one of the many several embodiments of the integrated, multi-level airport terminal system 100, the plurality of cells 110 are disposed in the adjoining relation to one another to further define at least one row 120. Each row 120 can include a set of two adjoining cells 110. Alternatively, in other preferred embodiments, each row 120 may include at least four adjoining cells 110. The plurality of cells 110 incorporating at least four cells 110 are disposed in the adjoining relation to one another to define at least one row 120.

Referring back to FIG. 7 and FIG. 8, a row 120*a* of four adjoining cells 110 can be disposed in a corresponding relation to another row 120*b* of four adjoining cells 110. Therefore, the four adjoining cells 110 within one row 120*a* can be in a corresponding relation to a set of four adjoining cells 110 within another row 120*b*. Accordingly, in one of the many preferred embodiments and merely as an example, the integrated, multi-level airport terminal system 100 can include sixteen cells 110, the sixteen cells 110 can be further apportioned into four rows 120, wherein each row 120 includes a set of four cells 110. Again, each group of four cells 110 are disposed in an adjoining relation to one another 110. The adjoining relation of cells 110 in relation to one another 110 allows at least one aircraft 130 to transit through an internal environment 110*a* of each of the cells 110. The adjoining relation of each cell 110 in relation to one another 110 can allow at least one aircraft 130 to transit from the internal environment 110*a* of one adjoining cell to the internal environment 110*a* of another adjoining cell 110.

Alternatively, in one of the other preferred embodiments, as shown in FIG. 8, the adjoining relation of each cell 110 in relation to one another 110 can allow a plurality of aircraft 130 to transit contemporaneously within each row 120. More specifically, the adjoining relation of each cell 110 in relation to another 110 allows a plurality of aircraft 130 to successfully transit through the internal environments 110*a* of each of the adjoining cells 110 within the same row 120. Therefore, as it may be appreciated by those skilled in the art, the adjoining relation of cells 110 in relation to each other conveniently addresses a multitude of issues currently in the prior art, including the one related to airport capacity.

Moving further, as shown in FIG. 2, at least one of the cells 110 of the integrated, multi-level airport terminal system 100 can specifically include structural and operative features supporting transiting of at least one aircraft 130, including deplaning and enplaning of passengers. At one of the other cells 110 may include features supporting cargo services. Yet another cell 110 may include features supporting maintenance of the aircraft or refueling. As such, in one of the many preferred embodiments, each cell 110 may include specific structural and operational features that contribute towards the overall transiting requirements of at least one aircraft 130. For instance, the first cell 110 adjoining to the second cell 110 within the same row 120*a* can include structural and operational features such as refueling or cargo services. Accordingly, each of the adjoining cells 110 within each row 120*a*, 120*b*, 120*c*, 120*d* can include specific structural and operational features that may sufficiently provide services related to transiting at least one aircraft 130.

Alternatively, as shown again in FIG. 2, in one of the several other preferred embodiments, each cell 110 within the row 120*a* may comprehensively include all the structural and operational features sufficiently contributing towards the transiting services of at least one aircraft 130. These comprehensive services may include, but are not limited to cargo, deplaning of passengers, enplaning of passengers, catering, fuel, maintenance, etc. As such, all the aforesaid services can be accomplished within one cell 110 rather than a plurality of cells 110 in a sequenced arrangement or order within each of the respective rows 120*a*, 120*b*, 120*c* 120*d* of the integrated, multi-level airport terminal system 100. Therefore, regardless of the plurality of preferred embodiments as stated, the adjoining relation of each cell 110 in relation to the one another 110 within each row 120*a*, 120*b*, 120*c*, 120*d* along with the corresponding relation of one row 120*a* in relation to another row 120*b*, 120*c*, 120*d* may greatly contribute towards the integration characteristics of the airport terminal system 100.

Figure 3:
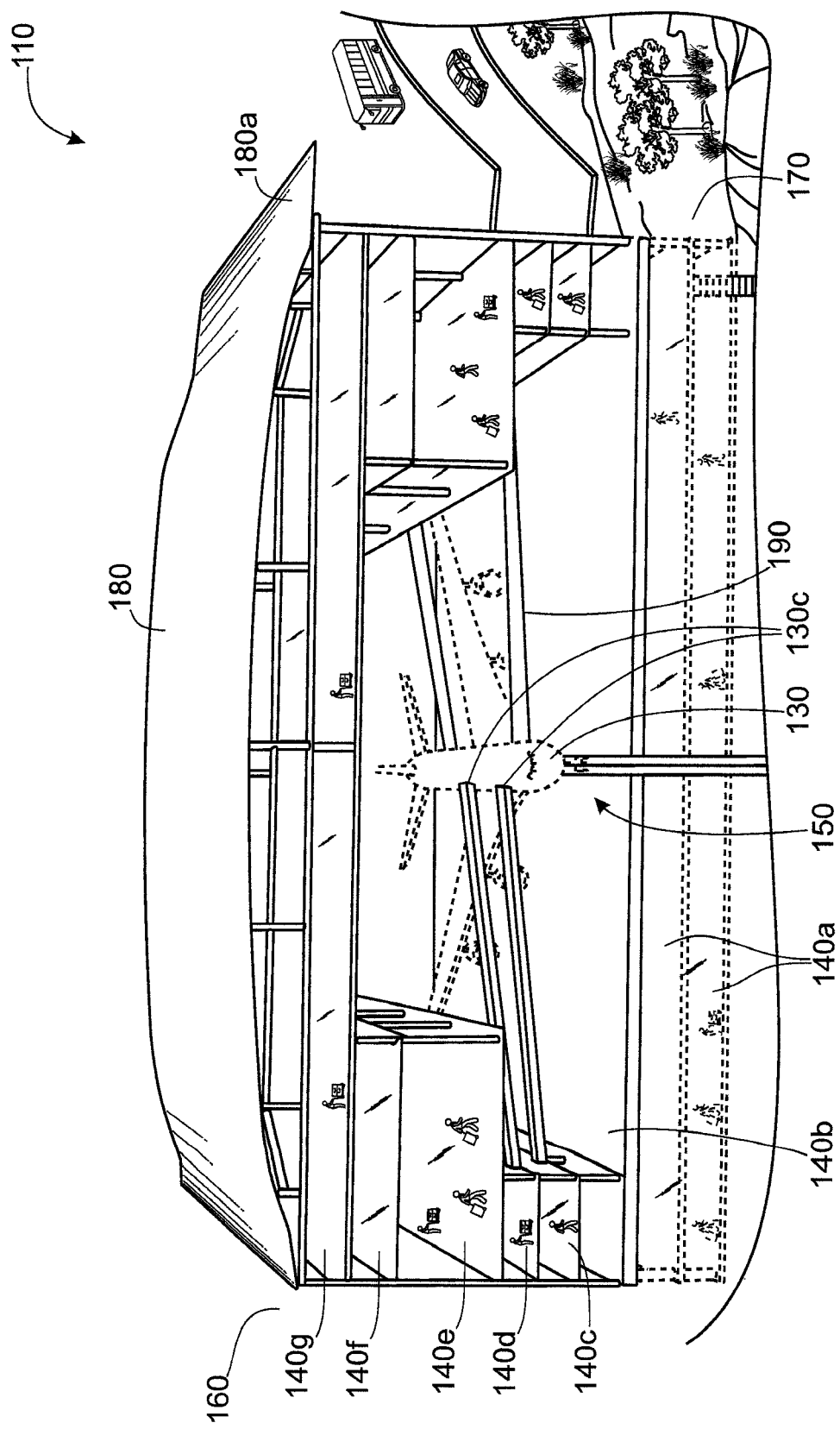
FIG. 3 is a top plan view of the integrated, multi-level airport terminal system in accordance to one of several preferred embodiments.
Figure 4:
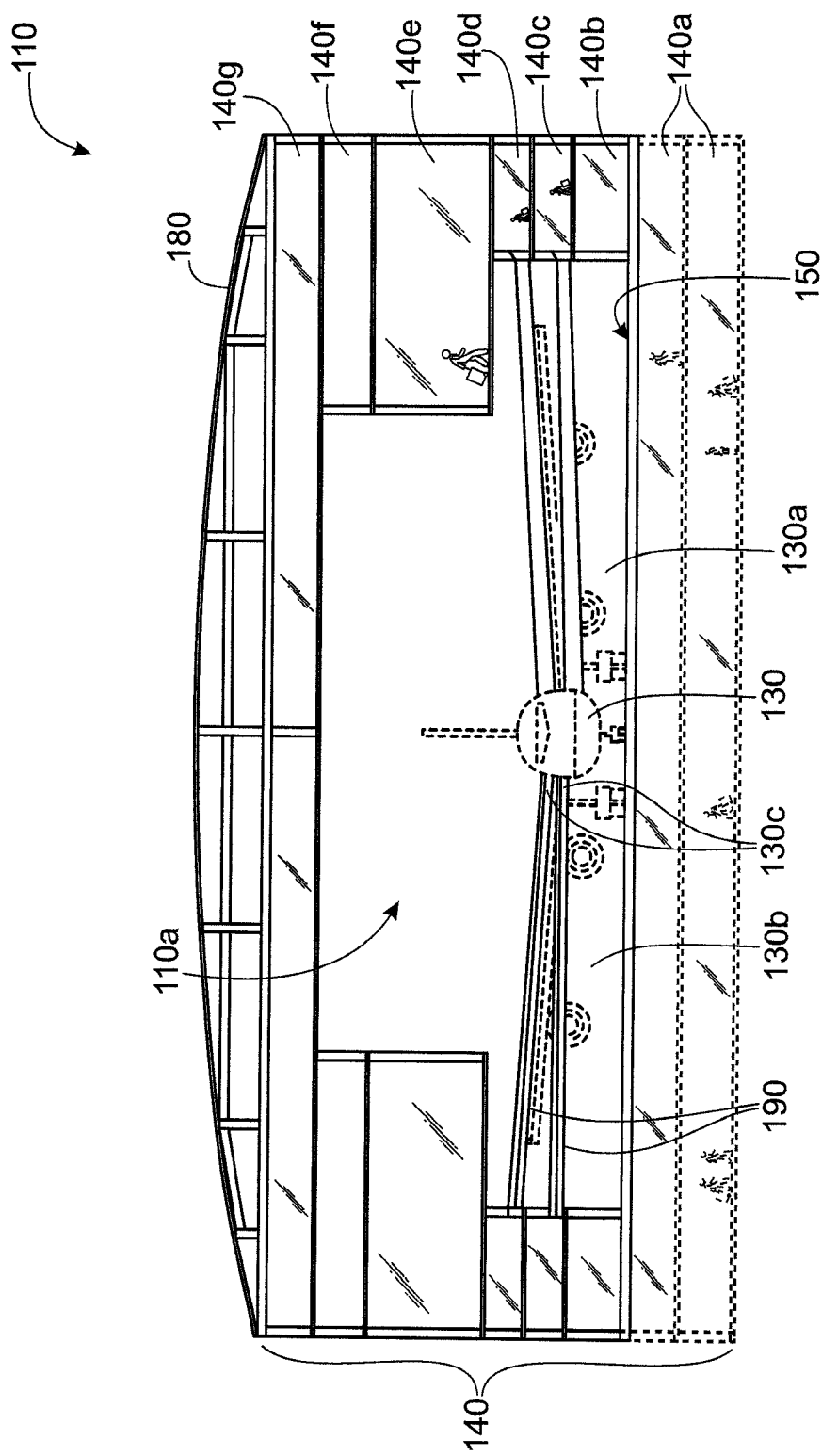
FIG. 4 is a front view of the integrated, multi-level airport terminal system in accordance to one of several preferred embodiments.
Figure 5:
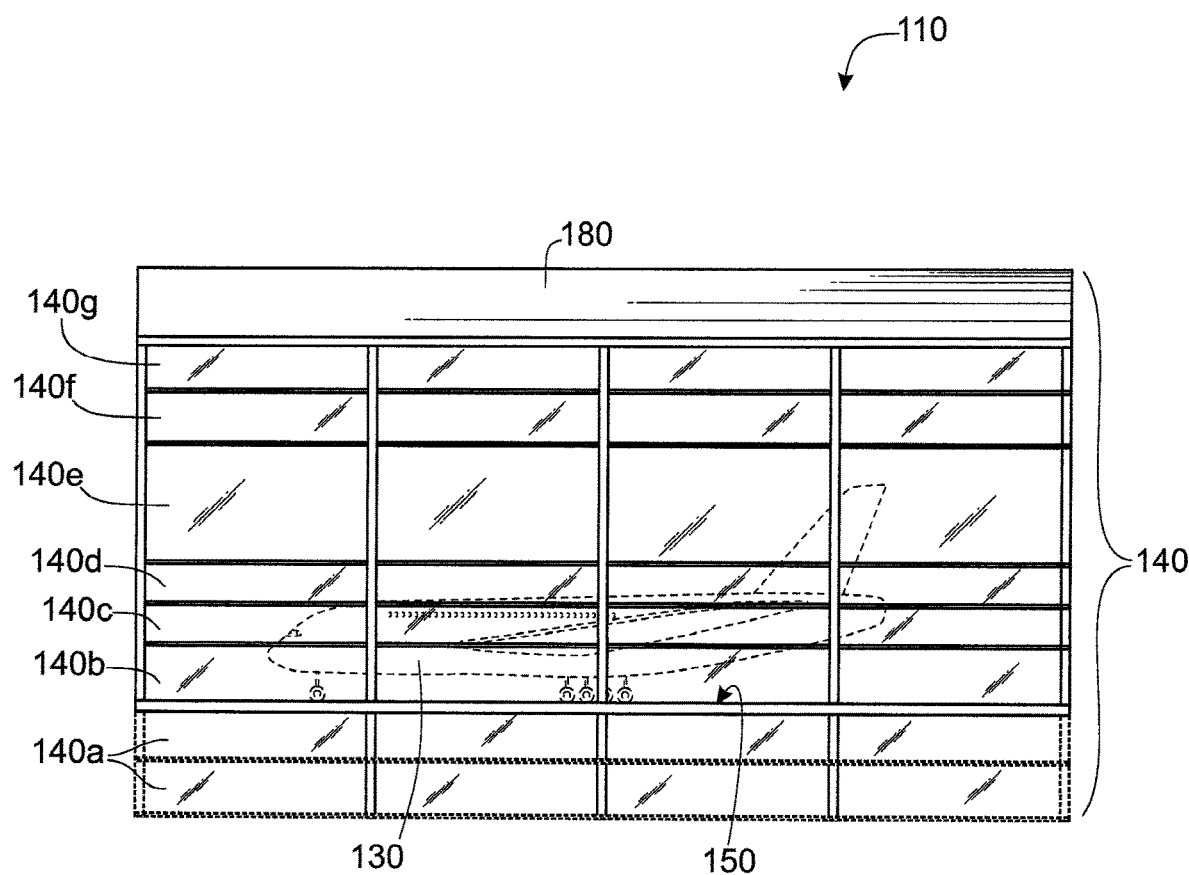
FIG. 5 is a side view of the integrated, multi-level airport terminal system in accordance to one of several preferred embodiments.

Referring now to FIG. 3 and FIG. 4, in one of the many preferred embodiments, each of the plurality of cells 110 of the integrated, multi-level airport system 100 includes a plurality of levels 140. As shown in greater detail in FIG. 4, the plurality of levels 140 may include multiple levels including, but not limited to: underground level 140*a*, ground level, 140*b*, a first level 140*c*, a second level 140*d*, a third level 140*e*, a fourth level 140*f*, fifth level 140*g*, etc. The integrated, multi-level airport system 100 may also include a ground level 140*b*, and at least one underground level 140*a* below the ground level 140*b*. Each of the plurality of levels 140 of each of the plurality of cells 110 may vary in number based on the plurality of the operational demands and size of the integrated, multi-level airport terminal system 100. For instance, and as shown in further detail in FIG. 3, in one of the several preferred embodiments, the underground level 140*a* may include two underground levels 140*a*, wherein one of the underground levels 140*a* is superimposed on the other. One of the underground levels 140*a* may include services related to baggage claim whereas one of the other underground levels 140*a* may include services related to transfer hall. Likewise, each of the plurality of levels 140 within each of the plurality of cells 110 may also vary and be disposed with individualized or multiple operational areas within the integrated, multi-level airport system 100. There is no limitation as to how each of the plurality of levels 140 can be disposed within the various preferred embodiments. Accordingly, a person skilled in the art may also understand and appreciate that there is no limitation as to how many levels 140 each of the plurality of the cells 110 can include. For instance, the ground level 140*b* can be structured and disposed for transiting and accommodating at least one entire aircraft 130 irrespective of its size, type, shape, and other variances. Similarly, the plurality of levels 140 can be customized and utilized for a singular operational service related to transiting of the aircraft 130, or alternatively, a multitude of operational processes related to aircraft 130 transiting.

Figure 6:
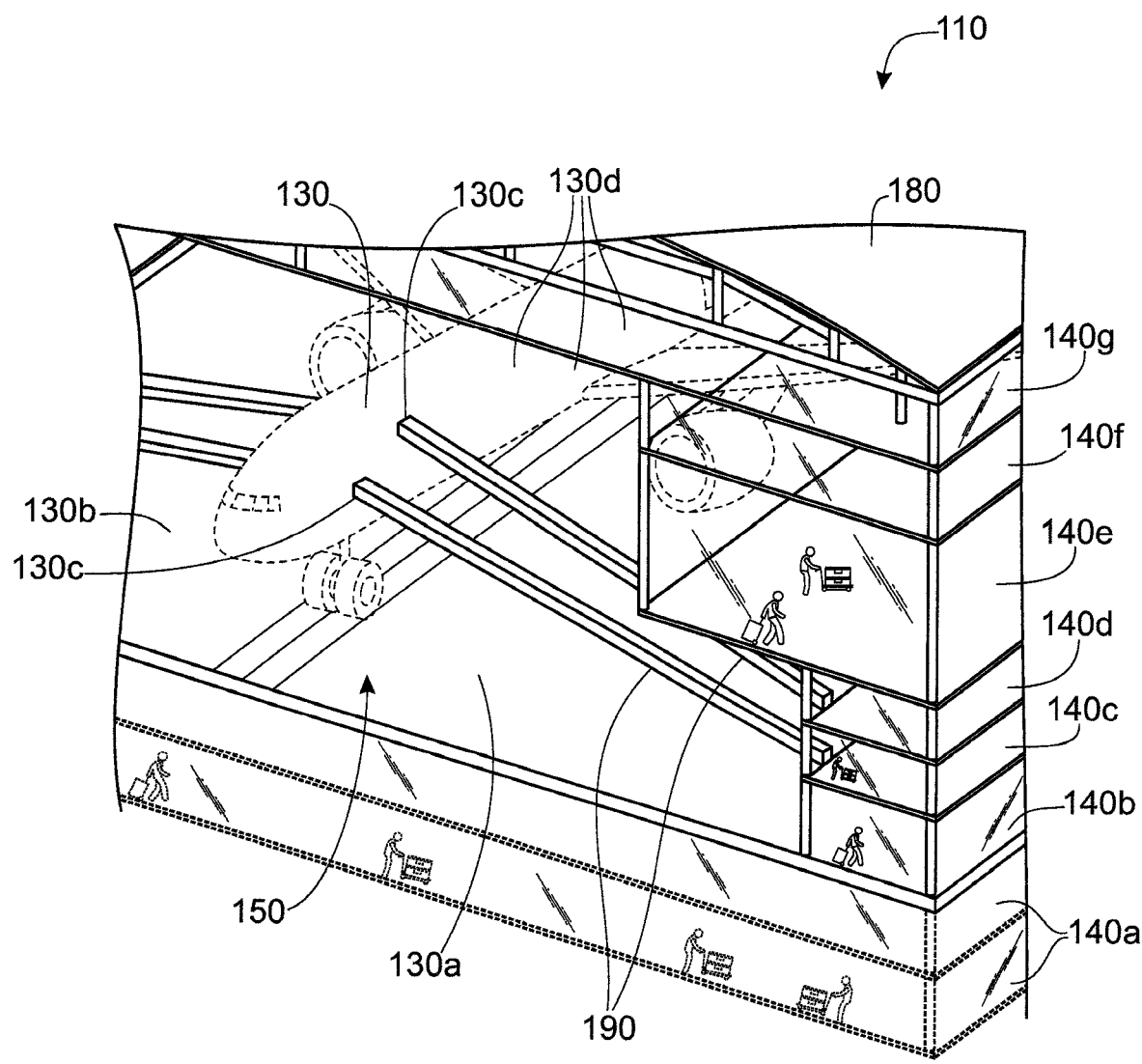
FIG. 6 is a top side view of the integrated, multi-level airport terminal system in accordance to one of several preferred embodiments.

Referring now to FIG. 3, FIG. 4, and FIG. 6, when the aircraft 130 is transiting within the internal environment 110*a* of at least one cell 110, the first level 140*c* or one of the lower levels 140*b*, 140*c* of the cell 110 on a "port side" 130*a* of the aircraft 130 can be used as departure area primarily for enplaning passengers on the upper level and lower level (not shown) of the aircraft 130. Conversely, the first level 140*c* of the cell 110 on the other side of the one cell 110 can be utilized as a designated arrivals area on a "starboard side" 130*b* of the aircraft 130 primarily for deplaning passengers from the upper and lower level of the aircraft 130. Structurally, the first level 140*c* or other lower levels 140*b*, 140*c* of the one cell 110 are disposed on each side 130*a*, 130*b* of at least one transiting aircraft 130 within the internal environment 110*a* of at least one cell 110. Having the plurality of levels 140 within each cell 110 disposed on either side 130*a*, 130*b* of the transiting aircraft 130 within the internal environment 110*a* of at least one cell 110 allows for the transiting aircraft 130 to be engaged in a plurality of operational processes.

While some amount of variation within each of the plurality of levels 140 is possible, one skilled in the art may also understand and appreciate that certain preferred embodiments of what each of the plurality of levels 140 may specifically function as will be best suited in maintaining the standardization of the integrated, multi-level airport terminal system 100. As such, it is possible that some of the levels 140 within each cell 110 as disclosed herein may be structured and disposed for providing specific preferred operational process or processes only. Accordingly, referring to FIG. 4 and FIG. 6, in one of many several preferred embodiments, the plurality of levels 140 may also be disposed below the ground level 140*b*. The plurality of levels 140 can include at least one underground level 140*a*, below the ground level 140*b*, within each of the plurality of cells 110. Each of at least one underground level 140*a* can be utilized for specific operational processes. For instance, as shown in greater detail in FIG. 4, in one of the many preferred embodiments, the integrated, multi-level airport system 100 may include two underground levels 140*a*. One of the underground levels 140*a* may be designated area for baggage claim, whereas one of the other underground levels 140*a* can serve as ground transportation area or passenger arrival pickup area.

As shown in FIGS. 3 and 4, the integrated, multi-level airport terminal system 100 also has a plurality of movable connectors 190. The moveable connectors 190 are disposed on one of the lower levels 140*c* and on one of the upper levels 140*d* of at least one cell 110. Specifically, the movable connectors 190 are disposed within the internal environment 110*a* of at least one cell 110 on the lower level 140*c*. Similarly, the movable connectors 190 are also disposed within the internal environment 110*a* of at least one cell 110 on the upper level 140*d*. The movable connectors 190 are integrated entirely within the cell's 110 internal environment 110*a*, thus allowing for connectivity with at least one aircraft 130, while it transits therein 110*a*.

Furthermore, the movable connectors 190 are further structured and disposed on each of the lower 140*c* and upper levels 140*d* of at least one cell 110 to provide at least temporary connectivity with a plurality of openings 130*c* disposed on the lower and upper levels of the transiting aircraft 130. More specifically, the movable connectors 190 are disposed in a temporarily connecting relation with the interior environment of the transiting aircraft 130 on each side 130*a*, 130*b* of the transiting aircraft 130 on each of the lower 140*c* and upper 140*d* levels of at least one cell 110. The connectivity between the movable connectors 190 and the various levels of the transiting aircraft 130 enables passengers to freely move between the interior environment of the aircraft 130 and each of the upper 140*d* and lower levels 140*c* of the cell 110. In addition, since the movable connectors 190 are integrated within the internal environment 110*a* of the cell 110, all movement of passengers between the transiting aircraft 130 and the levels 140*c*, 140*d* of the cell 110 contributes towards the integration characteristics of the airport terminal system 100 of the present invention.

Referring now to FIG. 3, FIG. 4, and FIG. 6, in one of many preferred embodiments, each of the plurality of movable connectors 190 are disposed in a communicating relation with each one of a plurality of aircraft seating zones 130*d* of the transiting aircraft 130 for allowing passengers to move between the transiting aircraft 130 and lower 140*c* and upper 140*d* levels of at least one cell 110. When the plurality of movable connectors 190 temporarily connect with a plurality of openings 130*c* (exit or entrance doors) on each of the port side 130*a* and the starboard side 130*b* of the transiting aircraft 130 and each of the lower and upper levels of the transiting aircraft 130, the movable connectors 190 are structured and disposed to communicate with each of the plurality of aircraft seating zones 130*d* of the transiting aircraft 130 to allow passengers to freely move between the transiting aircraft 130 and each of the lower 140*c* and upper 140*d* levels of at least one cell 110. Each of the plurality of movable connectors 190 allow passengers arriving into and departing from various aircraft seating zones 130*d* within the interior of the transiting aircraft 130 to move freely between the arrivals area and departures area located on the lower 140*c* and upper 140*d* levels of at least one cell 110.

More specifically, each of the plurality of aircraft zones 130*d* are determined by the seating positions of the passengers within the transiting aircraft 130. When the plurality of movable connectors 190 temporarily connect with the plurality of openings 130*c* (exit or entrance doors) on each of the lower and upper levels of the transiting aircraft 130 and communicate with the interior or interior environment of the transiting aircraft 130, the arriving or departing passengers can move freely through the movable connectors 190 between the interior environment of the transiting aircraft 130 and each of the levels 140*c*, 140*d* of at least one cell 110. For instance, the passengers exiting the transiting aircraft 130 within the designated aircraft zone 130*d* would depart the aircraft 130, moving through one of the movable connectors 190 connected and communicating with the exit or entrance door nearest to the aircraft seating zone 130*d*, leading onto the arrivals area on one of the lower 140*c* or upper 140*d* levels of the cell 110. Similarly, the passengers inside the departures area on one of the lower 140*c* or upper levels 140*d* of the cell 110 would move through one of the movable connectors 190 designated for the particular aircraft seating zone 130*d*, entering into the transiting aircraft 130 to claim their respective seats within a particular grouping. The entering passengers from the departures area of one of the lower 140*c* or upper 140*d* levels of the cell 110 would enter into the transiting aircraft 130 through the movable connectors 190 disposed on the lower 140*c* and upper 140 levels of the cell 110 on the port side 130*a* of the aircraft 130. However, to exit out, passengers of the transiting aircraft 130 would motion through the movable connectors 190 disposed on the lower 140*c* or upper 140*d* levels of the cell 110 on the starboard side 130*b* of the transiting aircraft onto to the arrivals area of one of the lower 140*c* or upper 140*d* levels of the cell 110.

Referring now to FIG. 1, FIG. 2, and FIG. 3 in one of several embodiments, the integrated, multi-level airport system 100 further includes at least one ramp member 150. As shown partially in FIG. 7 and FIG. 8, each of the ramp members 150 are connected to at least one landing and takeoff taxiway or runway 185 on the airside 160 of the integrated, multi-level airport terminal system 100. The connectivity of each ramp member 150 with each of the plurality of taxiways 185 contributes towards a smooth transition, when the aircraft is transiting in and out of the airport terminal system 100. When at least one aircraft 130 arrives at the airport terminal system 100, it typically taxis on one of the designated runways or taxiways 185 until it is guided to at least one of the ramp members 150 by the airport terminal system's 100 ground control authorities. The determination of the precise ramp member 150 the aircraft 130 will be directed towards is made by the ground traffic control authorities depending on many factors such as landing times of the aircraft, enplaning/deplaning times of the aircraft, overall traffic within each row 120 and each cell 110 of the airport terminal system 100, etc.

As shown in FIG. 1, FIG. 2, and FIG. 3, in one of the many preferred embodiments, at least one of the ramp members 150 is disposed through each of the plurality of cells 110 for transiting at least one aircraft 130 through at least one cell 110. The one ramp member 150 is disposed through an internal environment 110a of each of the plurality of cells 110 for transiting at least one aircraft 130. More specifically, the ramp member 150 is structured and disposed through the internal environment 110a of each of the plurality of cells 110 for providing a route for at least one aircraft 130 to transit within the internal environment 110a of each of the plurality of cells 110. The internal environment 110a of each of the plurality of cells 110 is structured to accommodate the entire transiting aircraft 130. The structure of each of the cell 110 and each of its internal environment 110 therein do not discriminate against the size, shape, type of the aircraft and can adopt to a plurality of aircraft 130 present in the aviation industry. Essentially, as shown in FIG. 7 and FIG. 8, each of the plurality of cells 110a is structured and disposed to accommodate and transit aircraft 130 of all sizes—from large commercial airliners 130 to smaller business or personal propeller aircraft 135.

Referring now to FIG. 3, FIG. 7, and FIG. 8, the ramp member 150 is disposed through the internal environment 110a for transiting at least one aircraft 130 through at least one of the plurality cells 110 in a sequential arrangement 175. The sequential arrangement 175 in which the aircraft 130 transit through the integrated, multi-level airport terminal system 100 depends on several factors, including but not limited to ramp member 150 time, transit time status of the aircraft 130 (originating, transiting or transfer), space availability of cells 110, and position of other transiting aircraft 130 within each of the cells 110. Additionally, the sequential arrangement 175 allows at least one aircraft 130 disposed on the ramp member 150 to transit from one cell 110 to another 110, thus allowing the at least one aircraft 130 to enter into the internal environment 110a of the cell 110 within the row 120.

Merely as an example and as shown in FIG. 7, in one of the many preferred embodiments, if each row 120a, 120b, 120c, 120d includes four cells 110a, 110b, 110c, 110d, and at least one aircraft 130 is authorized by the ground and operations control authorities into a particular cell 110b within one 120a of the plurality of rows 120, the aircraft 130 can be guided therein by entering into the internal environment 110a of one designated cell 110e at the end of the row 120a, move through the internal environment 110a of first cell 110e, enter into the internal environment 110a of the second cell 110d, adjoining the first cell 110e within the row 120a, then move through the internal environments 110a of third cell 110c adjoining the second cell 100d, thereby finally transiting into its destination cell 110b within the designated row 120a. Additionally, as shown in FIG. 7, there may be no other transiting aircraft 130 in other cells 110b, 110c, 110e, within one of the rows 120d and at least one aircraft 130 may simply be transiting within one 110d of the four cells 110b, 110c, 110e within one of the rows 120d. As such, the designation of cell 110 and row 120 can be based on other factors, including the possibility that the aircraft maybe an originating aircraft 130 from the city, where the integrated, multi-level airport system 100 is located. Alternatively, however, as shown in FIG. 8, there may be a plurality of aircraft 130 transiting within each of the internal environments 110a of the cells 110b, 110c, 110d, 110e within the rows 120a, 120b, 120c, 120d of the integrated, multi-level airport terminal system 100. Again, the designated position of aircraft 130 within the internal environments 110a of each of the cells 110b, 110c, 110d, 110e of each row 120a, 120b, 120c, 120d is determined by the authorities based on aforesaid numerous factors. Furthermore, referring back to FIG. 1, FIG. 2, and FIG. 3, the integrated, multi-level airport terminal system 100 can be divided into landside 170 and airside 160 areas. The landside 170 areas include parking lots, public transportation, train stations, natural landscape, and access roads. The airside 160 areas include all areas accessible to aircraft, including a plurality of runways or taxiways 185 and ramp members 150.

As shown in FIGS. 1, 2 and 3, the integrated, multi-level airport terminal system 100 further includes a roof member 180. The roof member 180 is disposed on each of the plurality of cells 110 to arrange from a landside 170 direction of the integrated, multi-level airport terminal system 100 to an airside 160 direction of the integrated, multi-level airport system 100. More specifically, the roof member 180 is structured in a wave-like arrangement from the landside 170 area of the integrated, multi-level airport terminal system 100 to the airside 160 area of the integrated, multi-level airport terminal system 100. The roof member has a provision (not shown) for natural top light to penetrate the lower levels and the upper levels of the integrated, multi-level airport terminal system 100, giving great visibility in all directions of each cell 110. Moreover, in one of the many preferred embodiments, the roof member 180 is further structured to have clear panels (not shown) disposed throughout its surface area, giving passengers spectacular views of the integrated, multi-level airport terminal system 100, take-off and landing of aircraft 130, as well as the transiting of aircraft 130 at respective arrival and departure areas in lower 140c and upper levels 140d of each of the plurality of cells 110.

Furthermore, in one of the many preferred embodiments, the roof member 180 is insulated against hot and cold outside air temperatures to reduce the air-conditioning and heating loads, while providing efficient thermal control of the integrated, multi-level airport terminal system. The roof member's 180 insulation also assists in meeting the zero carbon standard required with the internal environment of the airport terminal system. The roof member 180 incorporates solar panels (not shown) converting natural sun light into useful energy, supplementing the airport terminal's 100 energy source, thereby reducing the demand for an external electric source for power. Additionally, as shown in FIG. 1, FIG. 2, FIG. 3, the roof member 180 is structured and disposed to have an overhang member 180a. The overhang member 180 is disposed on each cell 110 on the landside 170 of the airport terminal system 100 for providing shade to all of the transparent frontage of each cell 110 of the integrated, multi-level airport terminal system 100. The overhang member 180*a* is also structured to reduce the overall temperature of the internal environment 110*a* within each of the cells 110 during hot hours of the day.

Figure 10:
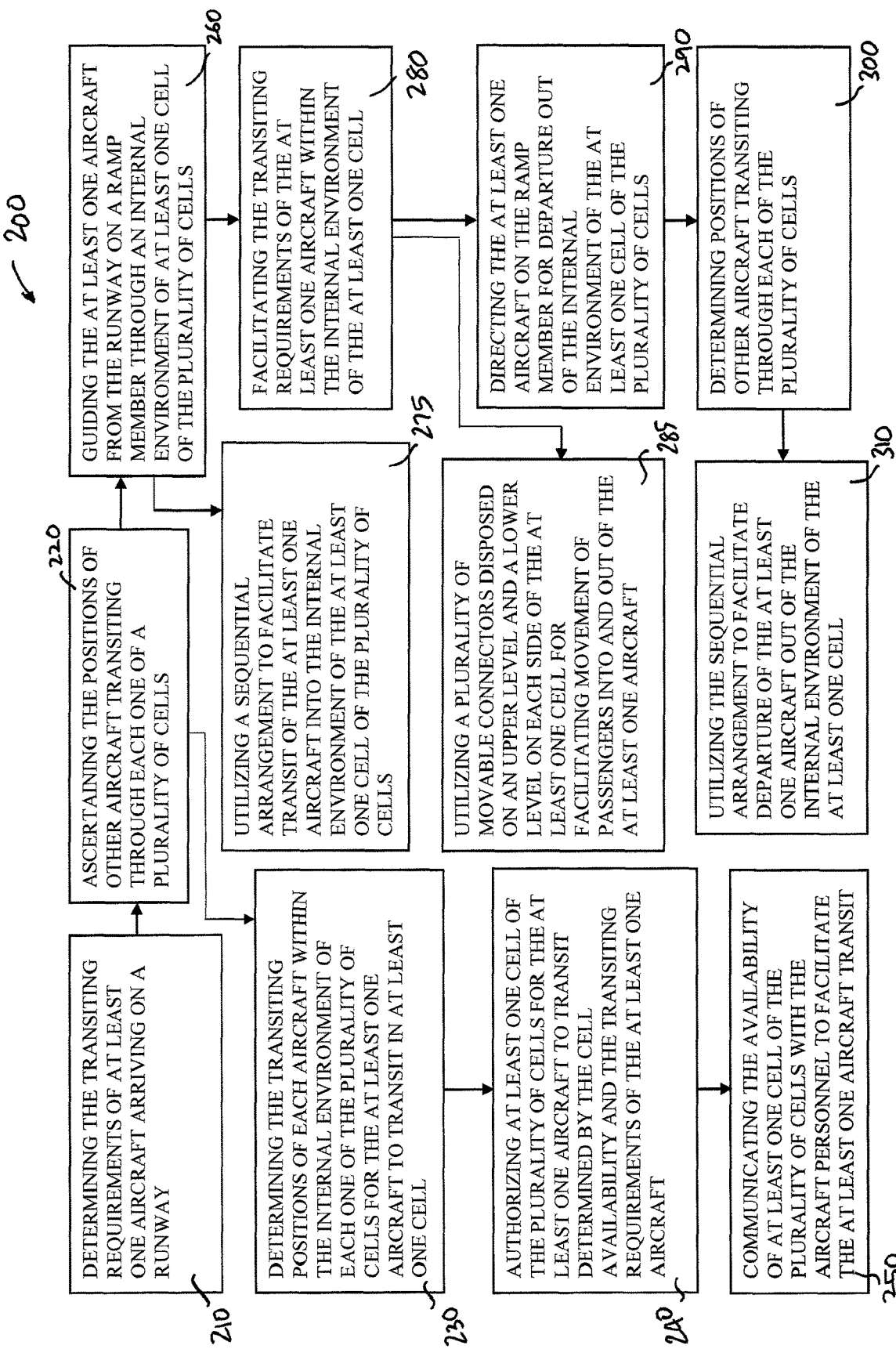
FIG. 10 is a flow chart of one of the methods of the integrated, multi-level terminal system in accordance one of several preferred embodiments.

Referring now to FIG. 10, the present invention includes a method of transiting at least one aircraft arriving in and departing out of an integrated, multi-level airport terminal system 200. The method of transiting at least one aircraft arriving in and departing out of the integrated, multi-level airport terminal system 200 includes determining the transiting requirements of at least one arriving aircraft on a runway 210. Particularly, the airport traffic control and tower authorities determine the transiting requirement of the at least one aircraft 130 arriving at the integrated, multi-level airport terminal system 100 prior to its arrival, and forward all the information to the appropriate personnel of a control tower (not shown). The authorities also directly communicate information regarding the cell 110 allocation at the integrated, multi-level airport terminal system 100 with the flight crew of the aircraft 130, prior to its arrival. Additionally, the transiting requirements of each of the arriving aircraft 130 is typically synchronized with the ground control, and ultimately to each of the cell's 110 self docking system (not shown). These actions initiate the transiting requirements of the at least one aircraft 130 within each of the cells 110. There are several other factors that contribute towards cell 110 allocation, including, but not limited to whether the aircraft 130 has a final destination at the airport terminal system 100, if the aircraft 130 is a transfer flight, requiring a quick turnaround with only embarking and disembarking of transfer passengers and a quick refueling as part of its transiting requirements, if the aircraft 130 is a commercial aircraft or a small business jet 135, or alternatively, if there are other exigent circumstances mandating immediate and unpredicted landing of the aircraft 130 at the integrated, multi-level airport terminal system 100.

As shown in FIG. 10, the method of transiting at least one aircraft arriving in and departing out of the integrated, multi-level airport terminal system 200 further includes ascertaining the positions of other aircraft transiting through each one of a plurality of cells 220. As shown in again in FIG. 10, ascertaining the positions of other aircraft 130 transiting through each one of the plurality of cells 110 further includes the method of determining the transiting positions of each aircraft within the internal environment of each one of the plurality of cells for the at least one aircraft to transit in at least one cell 230 and the method of authorizing at least one cell of the plurality of cells for the aircraft to transit determined by the cell availability and the transiting requirements of the aircraft 250. More specifically, as shown in FIG. 7 and FIG. 8, once the ground control and flight operations authorities determine the transiting requirements of the arriving aircraft 130, the position of each of the other transiting aircraft 130 within the airport terminal system 100 is ascertained. An airport surface detection equipment (ASDE), which is not shown, locates precisely the positions of each transiting aircraft 130 within the internal environment 110*a* of each of the cells 110 using a graphical display. The ground control and flight operations authorities are equipped with a search radar (not shown), which graphically displays each transiting aircraft 130 within each cell 110 of the integrated, multi-level airport terminal system 100. In addition, the authorities utilize a tower automated ground surveillance system (TAGS), which is again not shown to display position of each aircraft 130 from a signal transmitted by each aircraft 130. The signal further reveals details of each aircraft 130 including each unique flight identifier in real time within each of the cells 110*b*, 110*c*, 110*d*, 110*e* of each row 120*a*, 120*b*, 120*c*, 120*d* of the airport terminal system 100.

Furthermore, referring to FIG. 10, the method of transiting at least one aircraft arriving in and departing out of the integrated, multi-level airport terminal system 200 further includes guiding the at least one aircraft from the runway on a ramp member through an internal environment of at least one cell of the plurality of cells 260. Referring now to FIG. 3, FIG. 4, FIG. 7, FIG. 8 and FIG. 10, each cell 110*b*, 110*c*, 110*d*, 110*e* within each defined row 120*a*, 120*b*, 120*c*, 120*d* of the airport terminal system 100 can be marked or numbered in a distinct manner, allowing the ground control and operations authorities and aircraft 130 personnel to effectively communicate the position of the cell 110 within the integrated, multi-level airport terminal system. Once the communication is effectively made, the transiting aircraft 130 can be successfully guided into the cell 110. While most aircraft 130 are capable of facilitating ground movement on the taxiway 185 under their own power, once the position of the cell 110 for the transiting aircraft 130 is determined and communicated with the aircraft 130 personnel, the transiting aircraft 130 can be towed on the ramp member 150, disposed through the internal environment 110*a* of the cell 110, with the aid of an external power (not shown). The external power may include, but is not limited to tractors, tugs, or other similar vehicles capable of using their power to successfully place the transiting aircraft 130 into motion and move it into its desired location on the ramp member 150.

Moreover, the method of guiding the aircraft from the runway on the ramp member through an internal environment of at least one cell of the plurality of cells 260 further includes utilizing a sequential arrangement to facilitate transit of at least one aircraft into the internal environment of at least one cell of the plurality of cells 275. As shown in greater detail in FIGS. 7, 8 and 10, the sequential arrangement 185 of the aircraft 130 provides priority and organization of aircraft 130 transiting into the airport terminal system 100. The sequential arrangement 185 allows the transiting aircraft 130 to strategically position within each respective cell 110*b*, 110*c*, 110*d*, 110*e* of each respective row 120*a*, 120*b*, 120*c*, 120*d* based on several determining factors as previously mentioned. Furthermore, the transiting aircraft 130 are sequentially positioned within at least one cell 110*b*, 110*c*, 110*d*, 110*e* of at least one row 120*a*, 120*b*, 120*c*, 120*d* of the airport terminal system 100 to avoid congestion and smooth flow of traffic within the airport terminal system 100. The sequential arrangement 185 of aircraft 130 within the integrated, multi-level airport terminal system 100 allows transiting aircraft 130 to move effectively through each of the plurality of cells 110*b*, 110*c*, 110*d*, 110*e* within each of the rows 120*a*, 120*b*, 120*c*, 120*d* starting from arrival, to transit, and then departure. Typically, a transiting aircraft 130 with the quickest transiting turnaround may be sequenced in a cell 110 adjacent to another cell 110 with a transiting aircraft 130 with a relatively slower transiting turnaround and so on. Similarly, a transiting aircraft, which is an originating aircraft (aircraft originating from the location where the airport terminal system is physically located) may be sequenced in a different cell 110*c* of a different row 120*b* of the airport terminal 100 from a transfer aircraft 130 (arriving from another airport of another city to the airport terminal system) having to merely refuel and deplane and enplane transfer passengers on to their ultimate destination.

Likewise, the sequential arrangement 185 of the transiting aircraft 130 with a quicker departure time maybe directed first out of the internal environment 110a of the cell 110 than the transiting aircraft 130 with a slower departure time transiting behind the transiting aircraft 130 with the quicker departure time. This efficiency in sequential arrangement 185 promotes an ideal flow of transiting aircraft 130 in and out of the integrated, multi-level airport terminal system 100.

Referring again to FIG. 10, in one of the several preferred embodiments, the method of transiting at least one aircraft arriving in and departing out of the integrated, multi-level airport terminal system 200 further includes facilitating the transiting requirements of the at least one aircraft within the internal environment of at least one cell 280. The transiting requirements within the cell 110 may include, but are not limited to a plurality of operational process such as passenger enplaning and deplaning, cargo handling, cargo security, aircraft 130 maintenance, aircraft 130 fueling, baggage transfers, baggage handling, lavatory, cleaning, cabin, catering, airport terminal 100 services, field operations, etc. Accordingly, when at least one aircraft 130 is guided to the cell 110 and thereby transits within the internal environment 110a of the cell 110, the transiting requirements on the aircraft 130 commence. The nature of the transiting requirements can be predetermined based on the information provided to the authorities of the airport terminal 100. In other instances, additional transiting requirements can be supplemented after the aircraft 130 is inspected. As such, the operational processes within the cell's 110 internal environment 110a are determined by many factors, including the status of the aircraft 130 (destination, transfer or originating), ramp member 150 time, size of the aircraft 130, type of the aircraft 130, etc. So for instance, if the transiting aircraft 130 within the cell's 110 internal environment 110a is an originating flight, the operational processes related to that aircraft 130 may not include deplaning of passengers. However, if the transiting aircraft 130 within the cell's 110 internal environment 110a is a transfer or destination flight, then passengers would probably be required to enplane and deplane the aircraft 130.

Referring to FIG. 10 again, the method of facilitating the transiting requirements of the at least one aircraft within the internal environment 280 further includes utilizing a plurality of movable connectors disposed on an upper level and a lower level on each side of at least one cell for facilitating movement of passengers into and out of the at least one aircraft 285. Specifically, as shown in FIGS. 3 and 4, the movable connectors 190 are disposed on the lower 140c and upper 140d level of at least one cell 110 allow passengers on the lower and upper level of the transiting aircraft 130 to enplane and deplane without requiring the passengers on the upper level of the transiting aircraft 130 to descend down to the lower level of the transiting aircraft 130, or alternatively, the passengers on the lower level of the transiting aircraft 130 to ascend up to the upper level of the transiting aircraft 130. Having the plurality of movable connectors 190 disposed on the lower 140c and upper 140d level of at least one cell 110 allows passengers to enplane the levels of the aircraft 130 directly from the upper 140d level and lower 140c level of the cell 130. The movement of passengers on the upper and lower level also decreases the overall enplaning or deplaning times of the transiting aircraft. Furthermore, the plurality of movable connectors 190 are located on the starboard side 130b or on the port side 130a of the transiting aircraft 130. Accordingly, in one of many preferred embodiments, passengers can board the transiting aircraft 130 from upper 140d and lower 140c level of the cell 110 onto the upper and lower level of the transiting aircraft 130 from the port side 130a of the aircraft. Conversely, the passengers can deplane from the upper and lower level of the transiting aircraft on to the upper 140d and lower 140c level of the cell 110 from the starboard side 130b of the transiting aircraft 130. As such, having efficiency in enplaning and deplaning times minimizes the risk of flight delays and accommodates for extra time that the aircraft 130 may need in other operational processes while transiting within the internal environment 110a of the cell 110.

Furthermore, as shown in greater detail in FIG. 1, FIG. 3, FIG. 4, and FIG. 6, the plurality of movable connectors 190 temporarily connect on the starboard side 130b or the port side 130a of at least one aircraft 130 for facilitating movement of passengers between the internal environment of the at least one aircraft 130 and each of the levels 140c, 140d on each side of at least one cell 110. Particularly, once the passengers have deplaned, only the service personnel have access to the plurality of movable connectors 190 on the starboard side 130b. Once the service tasks are completed by the personnel, the plurality of movable connectors 190 on the starboard side 130b are withdrawn as part of immigration and security protocols. Each of the movable connectors 190 allow passengers arriving into or departing from various aircraft seating zones 130d within the interior of the transiting aircraft 130 to move freely between the arrivals area or departures area located on the lower 140c and upper 140d levels of at least one cell 110 and the interior of the transiting aircraft. 130 The plurality of aircraft seating zones 130d can be determined by the designated seating positions of the passengers. Accordingly, when the movable connectors 190 are temporarily connected with the exit or entrance doors on each of the lower and upper levels of the transiting aircraft 130 and communicate with the interior of the aircraft 130, the arriving or departing passengers can move freely through the movable connectors 190 between the interior of the aircraft 130, and the departures and arrivals area located on the lower 140c and upper 140d level of the cell 110, primarily based on the aircraft seating zones 130d determined by each passenger's designated seats.

Once the transiting requirements on at least one aircraft 130 within the internal environment 110a of the cell 110 are fully completed, the aircraft 130 is authorized for departure by the ground control authorities. Referring to FIG. 10, when the aircraft is ready for departure out of the integrated, multi-level airport terminal system, the method of transiting at least one aircraft in and out of the integrated, multi-level airport terminal system 200 includes directing the at least one aircraft on the ramp member out of the internal environment of at least one cell of the plurality of cells for the aircraft departure 290. Particularly, as shown in greater detail in FIG. 7 and FIG. 8, the ground control and operations authorities determine the positions of other aircraft 130 presently transiting through each of the plurality of cells 110.

As such, the method of directing the at least one aircraft on the ramp member out of the internal environment of at least one cell of the plurality of cells for the aircraft departure 290 further includes determining positions of other aircraft transiting through each of the plurality of cells 300. Specifically, as shown in FIGS. 7 and 8, since multiple aircraft 130 may be ready for departure simultaneously or within close proximity of times, it is necessary for the authorities to coordinate proper movements of the aircraft 130 within each cell 110b, 110c, 110d, 110e of each row 120a, 120b, 120c, 120d. The authorities determine the positions of other transiting aircraft 130 within each of the cells 110b, 110c, 110d, 110e within each of the rows 120a, 120b, 120c, 120d. If no safety or obstruction issues are found, clearance for departure is granted. The aircraft 130 can then proceed with the aid of external power such as tugs or tractors (not shown) towards the airside 160 of the integrated, multi-level airport terminal system 100 in a sequential arrangement 175.

After the positions are verified and at least one aircraft is authorized for departure based on its scheduled departure time, referring to FIG. 10, the method of directing at least one aircraft out of the internal environment of at least one cell of the plurality of cells for aircraft departure 290 further includes utilizing sequential arrangement to facilitate transit of at least one aircraft out of the internal environment of at least one cell 310. More specifically, as shown in greater detail in FIG. 3, FIG. 4, FIG. 7, and FIG. 8, in one of the many preferred embodiments, the aircraft 130 with quicker transit times at the airport terminal system 100 will be positioned in the cell closer to the airside 160 of the airport terminal system 100 than the aircraft in the cell 110 with slower transit times. This is because the aircraft 130 with quicker transit times has to sequence out for its departure before and ahead of the aircraft 130 with slower transit times within the same row 120. As such, in one of the many preferred embodiments, in order to facilitate the sequential arrangement 175 of aircraft 130 at the integrated, multi-level airport terminal system 100, the aircraft 130 with quicker transit times may be positioned closer to the airside 160, ahead of the aircraft 130 with slower transit times within the sequencing arrangement 175 of the aircraft 130 at the integrated, multi-level airport terminal system 100.

The sequential arrangement 175 of aircraft 130 at the airport terminal system 100 further prevents congestion due to aircraft 130 traffic by allowing transiting aircraft 130 with quicker transit times to depart first from the airside 160 of the airport terminal system 100, where the runways 185 for departure are located. Moreover, as shown in FIG. 3, FIG. 7 and FIG. 8, in one of the many preferred embodiments for instance, the aircraft 130 with the quicker transit times may strategically transit in at least one cell 110b, which is closer to the airside 160 than landside 170 of the airport terminal system 100, if multiple aircraft 130 are transiting within the same row 120a. As such, the aircraft 130 requiring quicker transiting times within the same row 130a can depart earlier without any obstruction from the aircraft 130 with slower transiting times.

Any of the above methods may be completed in sequential order in at least one preferred embodiment, though they may be completed in any other order in other preferred embodiments. In at least one of the preferred embodiments, the above methods may be exclusively performed, but in other preferred embodiments, one or more steps of the methods as described may be skipped. Although only a few preferred embodiments of this invention have been described in detail above, those skilled in the art will readily appreciate that many modifications are possible in the exemplary embodiments without materially departing from the novel teachings and advantages of this invention.

Furthermore, since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An integrated, multi-level airport terminal system comprising:
   a plurality of cells disposed in an adjoining and corresponding relation to one another;
   each of said plurality of cells further comprising a plurality of levels, wherein said plurality of levels have at least a lower level and at least an upper level;
   at least one ramp member disposed through an entirely covered internal environment of each of said plurality of cells for transiting at least one entire aircraft; and
   a plurality of movable connectors disposed on said at least lower level and said at least upper level of said plurality of levels of said plurality of cells and temporarily connected to each of a plurality of openings disposed on an upper level and a lower level of at least one aircraft.

2. The integrated, multi-level airport terminal system as recited in claim 1 wherein said at least one ramp member is disposed through the internal environment of each of said plurality of cells for transiting at least one aircraft in a sequential arrangement.

3. The integrated, multi-level airport terminal system as recited in claim 1 wherein each of said plurality of cells are disposed in said adjoining relation to one another to define at least one row.

4. The integrated, multi-level airport terminal system as recited in claim 3 wherein said at least one row is disposed in a corresponding relation to at least another row.

5. The integrated, multi-level airport terminal system as recited in claim 1 further comprises a roof member disposed on each of said plurality of cells and structured to orient from a landside direction of said airport terminal system to an airside direction of said airport terminal system.

6. The integrated, multi-level airport terminal system as recited in claim 1 wherein each of said plurality of movable connectors are disposed in a temporarily connecting relation with the internal environment of at least one aircraft to allow passengers of at least one aircraft to move through each of said plurality of movable connectors on a star board side and a port side of at least one aircraft.

7. The integrated, multi-level airport terminal system as recited in claim 1 wherein each of said plurality of movable connectors are disposed in a communicating relation with each of a plurality of aircraft zones of at least one aircraft for facilitating passenger movement between the internal environment of at least one aircraft and each of said levels.

8. An integrated, multi-level airport terminal system comprising:
   a plurality of cells disposed in an adjoining and corresponding relation to each other;
   each of said plurality of cells comprising a plurality of levels;
   at least one ramp member disposed through each of said plurality of cells for transiting at least one entire aircraft through an entirely covered internal environment of each of said plurality of cells in a linearly sequential arrangement and;
   a plurality of movable connectors disposed in a communicating relation with each one of a plurality of aircraft seating zones on a starboard side and a port side of at least one aircraft.

9. The integrated, multi-level airport terminal system as recited in claim 8 wherein said plurality of levels further comprises at least one lower level and at least one upper level.

10. The integrated, multi-level airport terminal system as recited in claim 8 further comprises a plurality of movable connectors disposed on said at least one lower level and said at least one upper level of said plurality of cells, wherein said plurality of movable connectors are disposed in a temporarily communicating relation with the internal environment of at least one 23 aircraft for facilitating movement of passengers between at least one aircraft and each of said 1 levels.

11. The integrated, multi-level airport terminal system as recited in claim 10 wherein each of said plurality of movable connectors are disposed in a temporarily communicating relation with the internal environment of at least one aircraft to allow passengers of at least one aircraft to move through each of said plurality of movable connectors in accordance with each of said plurality of aircraft seating zones.

\* \* \* \* \*